United States Patent
Kikuta et al.

(10) Patent No.: US 10,738,771 B2
(45) Date of Patent: Aug. 11, 2020

(54) ELECTRIC PUMP AND CLEANING DEVICE FOR ON-VEHICLE OPTICAL SENSOR

(71) Applicant: DENSO CORPORATION, Kariya (JP)

(72) Inventors: Tomoyuki Kikuta, Toyohashi (JP); Keita Kawai, Toyohashi (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 16/365,607

(22) Filed: Mar. 26, 2019

(65) Prior Publication Data

US 2019/0219043 A1  Jul. 18, 2019

Related U.S. Application Data

(62) Division of application No. 14/486,146, filed on Sep. 15, 2014, now abandoned.

(30) Foreign Application Priority Data

Sep. 19, 2013 (JP) .................. 2013-194215
Jul. 3, 2014 (JP) .................. 2014-137676

(51) Int. Cl.
*F04B 19/06* (2006.01)
*F04B 23/02* (2006.01)
(Continued)

(52) U.S. Cl.
CPC .............. *F04B 19/06* (2013.01); *B60S 1/56* (2013.01); *F04B 13/02* (2013.01); *F04B 23/02* (2013.01); *B60S 1/528* (2013.01)

(58) Field of Classification Search
CPC .... F04B 7/04; F04B 9/02; F04B 9/025; F04B 2300/802–8093
See application file for complete search history.

(56) References Cited

U.S. PATENT DOCUMENTS 3,288,072 A * 11/1966 McKenzie .............. F04B 13/00
417/417
4,509,904 A 4/1985 MacAskill et al.
(Continued)

FOREIGN PATENT DOCUMENTS

CN       1928363 A     3/2007
CN    2019-23091 U     8/2011
(Continued)

OTHER PUBLICATIONS

Chinese Office Action for Application No. 201410476057.9; dated Sep. 5, 2017; original office action (8 pages); machine translation of office action (9 pages) (17 pages total).
(Continued)

*Primary Examiner* — Bryan M Lettman
(74) *Attorney, Agent, or Firm* — Patterson Thuente Pedersen, P.A.

(57) ABSTRACT

An electric pump includes a cylinder, a piston, a motor, and a discharge valve. The cylinder includes a valve port and a discharge port, which is in communication with the valve port. The discharge valve opens and closes the valve port. When the piston is moved forth to narrow a void in the cylinder, air is compressed in the cylinder. The discharge valve opens when operated by the piston that moves forth. The discharge valve opens and discharges compressed air from the valve port so that fluid including air is discharged from the discharge port.

8 Claims, 19 Drawing Sheets

(51) Int. Cl.
*F04B 13/02* (2006.01)
*B60S 1/56* (2006.01)
*B60S 1/52* (2006.01)

(56) References Cited

U.S. PATENT DOCUMENTS

| | | |
|---|---|---|
| 4,699,572 A | 10/1987 | Balkau et al. |
| 4,750,871 A | 7/1988 | Curwen |
| 4,790,726 A | 12/1988 | Balkau et al. |
| 6,281,649 B1 | 8/2001 | Ouellette et al. |
| 6,439,104 B1 | 8/2002 | Tonogai et al. |
| 6,917,693 B1 | 7/2005 | Kiridena et al. |
| 2006/0113404 A1 | 6/2006 | Sato et al. |
| 2007/0059183 A1 | 3/2007 | Umemura et al. |
| 2011/0073142 A1* | 3/2011 | Hattori .............. B60S 1/0848 134/56 R |
| 2012/0117745 A1* | 5/2012 | Hattori .............. B60S 1/0848 15/250.01 |
| 2013/0048036 A1 | 2/2013 | Jonas |

FOREIGN PATENT DOCUMENTS

| | | |
|---|---|---|
| DE | 10232227 | 1/2004 |
| GB | 1204371 A | 9/1970 |
| JP | S58-501474 A | 9/1983 |
| JP | S60-49060 U | 9/1983 |
| JP | 06-123283 | 5/1994 |
| JP | 2006-123283 | 5/1994 |
| JP | 2001-041159 | 2/2001 |
| JP | 2003-137076 A | 5/2003 |
| JP | 2012-035654 | 2/2012 |
| WO | WO 2002/29251 | 4/2002 |

OTHER PUBLICATIONS

Japanese Office Action for Application No. 2014-137676, dated Mar. 13, 2018 and English Language Machine Translation (Office Action—6 pgs; English Translation—6 pgs.).

* cited by examiner

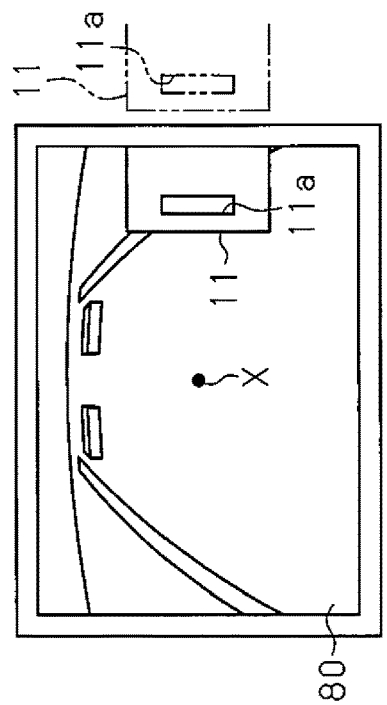
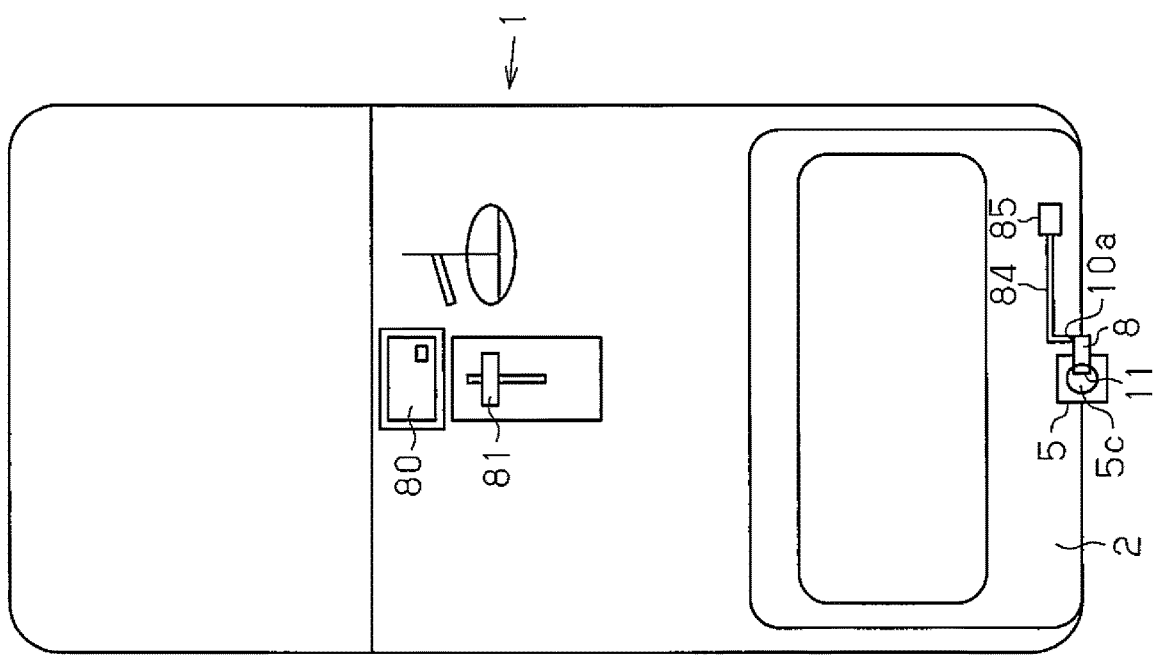

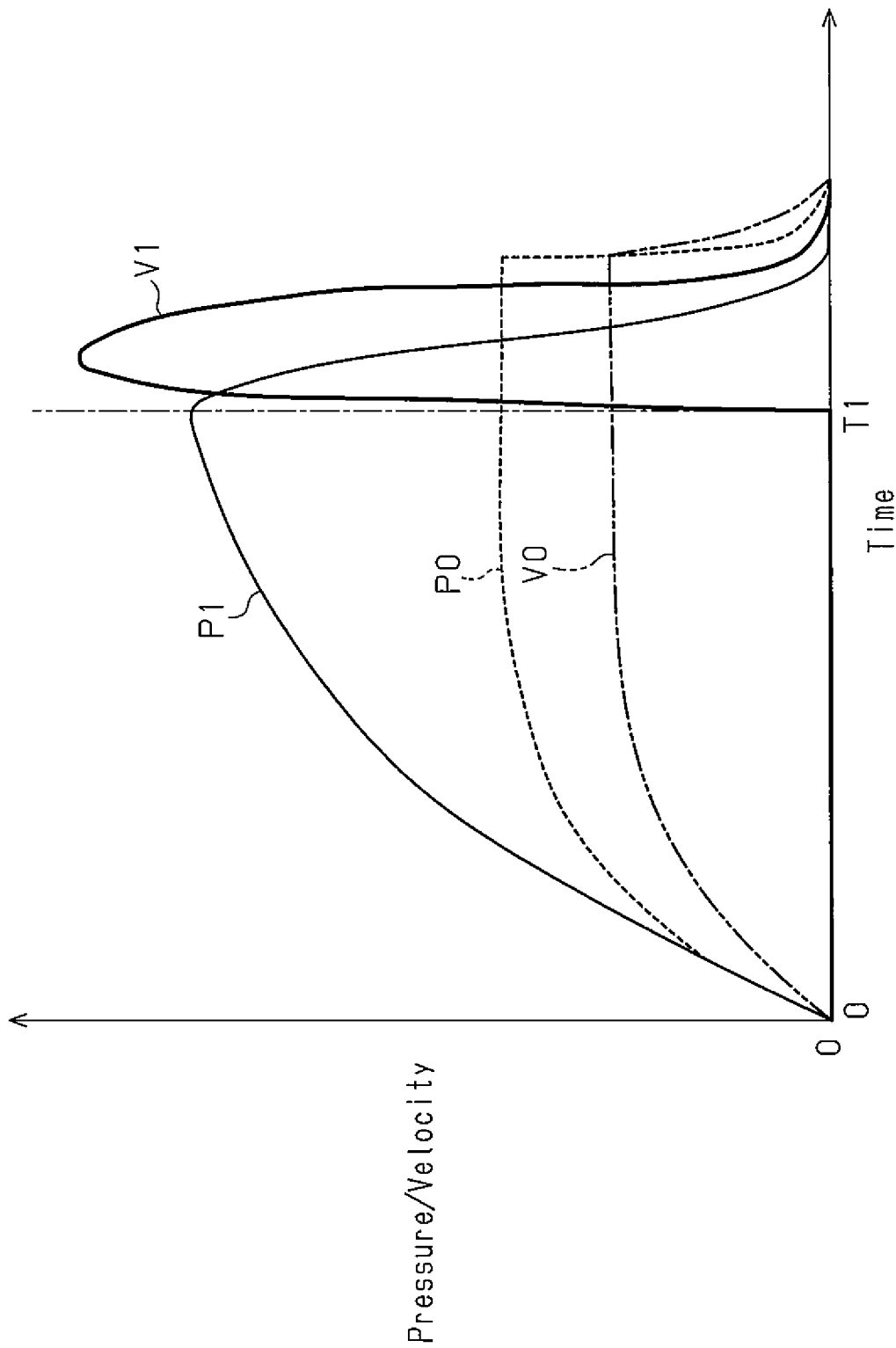

ELECTRIC PUMP AND CLEANING DEVICE FOR ON-VEHICLE OPTICAL SENSOR

RELATED APPLICATION

This application is a division of application Ser. No. 14/486,146 filed Sep. 15, 2014, which claims the benefit of priority of Japanese Application No. 2014-137676, filed Jul. 3, 2014, and Japanese Application No. 2013-194215, filed Sep. 19, 2013, said applications being hereby fully incorporated herein by reference.

BACKGROUND OF THE INVENTION

The present invention relates to an electric pump and a cleaning device for an on-board optical sensor.

On-board optical sensors are now often arranged on the front or rear of vehicles to use the images captured by the on-board optical sensors. Foreign material such as mud may collect on an external image capturing surface (lens or protective glass) of such an on-board optical sensor. Thus, an on-board optical sensor cleaning device has been proposed to eject air toward an external image capturing surface from an ejection port of a nozzle (refer to, for example, Japanese Laid-Open Patent Publication No. 2012-35654).

An air pump (electric pump) connected to a nozzle that ejects air has also been proposed (refer to, for example, Japanese Laid-Open Patent Publication No. 2001-41159). The air pump includes a tubular cylinder, a piston that is movable back and forth in the cylinder, an electric drive device that drives and moves the piston back and forth, a discharge port through which the inner and outer sides of the cylinder are in communication, and a discharge valve that functions to open and close the discharge port. The discharge valve of the air pump is a ball that is biased to perform a closing action. When the air in the cylinder is compressed, the pressure of the compressed air results in the ball performing an opening action. More specifically, in the air pump, when the driving force of the electric drive device moves the piston to narrow the void in the cylinder, the air in the cylinder is compressed. The pressure of the compressed air opens the discharge valve and discharges compressed air from the discharge port.

However, in an air pump such as that described above, the pressure of the compressed air opens the discharge valve. Thus, air may leak from the discharge valve when undergoing compression. This may hinder the momentary discharge (ejection) of high-pressure air having the set (expected) amount and pressure. Further, the on-board optical sensor cleaning device may therefore fail to clean the external image capturing surface.

SUMMARY OF THE INVENTION

It is an object of the present invention to provide an electric pump and a cleaning device for an on-board optical sensor that allows for momentary discharge of high-pressure air of a set amount and a set pressure.

To achieve the above object, one aspect of the present invention is an electric pump including a tubular cylinder, a piston, a motor, and a discharge valve. The cylinder includes a valve port and a discharge port, which is in communication with the valve port. Inner and outer sides of the cylinder are in communication through the valve port. The piston is movable back and forth in the cylinder. The motor drives and moves the piston back and forth. The discharge valve functions to open and close the valve port. When the piston is moved forth to narrow a void in the cylinder, air is compressed in the cylinder. The discharge valve is configured to open when operated by the piston that moves forth. The discharge valve opens and discharges compressed air from the valve port so that fluid including air is discharged from the discharge port.

A further aspect of the present invention is an on-board optical sensor cleaning device including an electric pump, a nozzle, and a mixing member. The electric pump includes a tubular cylinder, a piston, a motor, and a discharge valve. The cylinder includes a valve port and a discharge port. Inner and outer sides of the cylinder are in communication through the valve port. The piston is movable back and forth in the cylinder. The motor drives and moves the piston back and forth. The discharge valve functions to open and close the valve port. When the piston is moved forth to narrow a void in the cylinder, air is compressed in the cylinder. The discharge valve is configured to open when operated by the piston that moves forth. The discharge valve opens and discharges compressed air through the valve port and from the discharge port. The nozzle is connected to the discharge port. The nozzle includes an ejection port. The mixing member connects the discharge port and the nozzle and includes a liquid inlet. Washer liquid is drawn to the mixing member through the liquid inlet. The on-board optical sensor cleaning device ejects fluid including air from the ejection port toward an external image capturing surface of an on-board optical sensor mounted on a vehicle to remove foreign material from the external image capturing surface.

BRIEF DESCRIPTION OF THE DRAWINGS

The invention, together with objects and advantages thereof, may best be understood by reference to the following description of the presently preferred embodiments together with the accompanying drawings in which:

FIG. 1A is a schematic diagram of a vehicle including an on-board optical sensor cleaning device according to a first embodiment of the present invention;

FIG. 1B is a schematic diagram of a display shown in FIG. 1A;

FIG. 8 is a time-pressure/velocity characteristic diagram illustrating the results of an experiment conducted on the air pump of FIG. 6;

DETAILED DESCRIPTION OF THE PREFERRED EMBODIMENTS

One embodiment of an on-board optical sensor cleaning device mounted on a vehicle will now be described with reference to FIGS. 1A to 8.

As shown in FIG. 1A, the rear of a vehicle 1 includes a back door 2.

Figure 2:
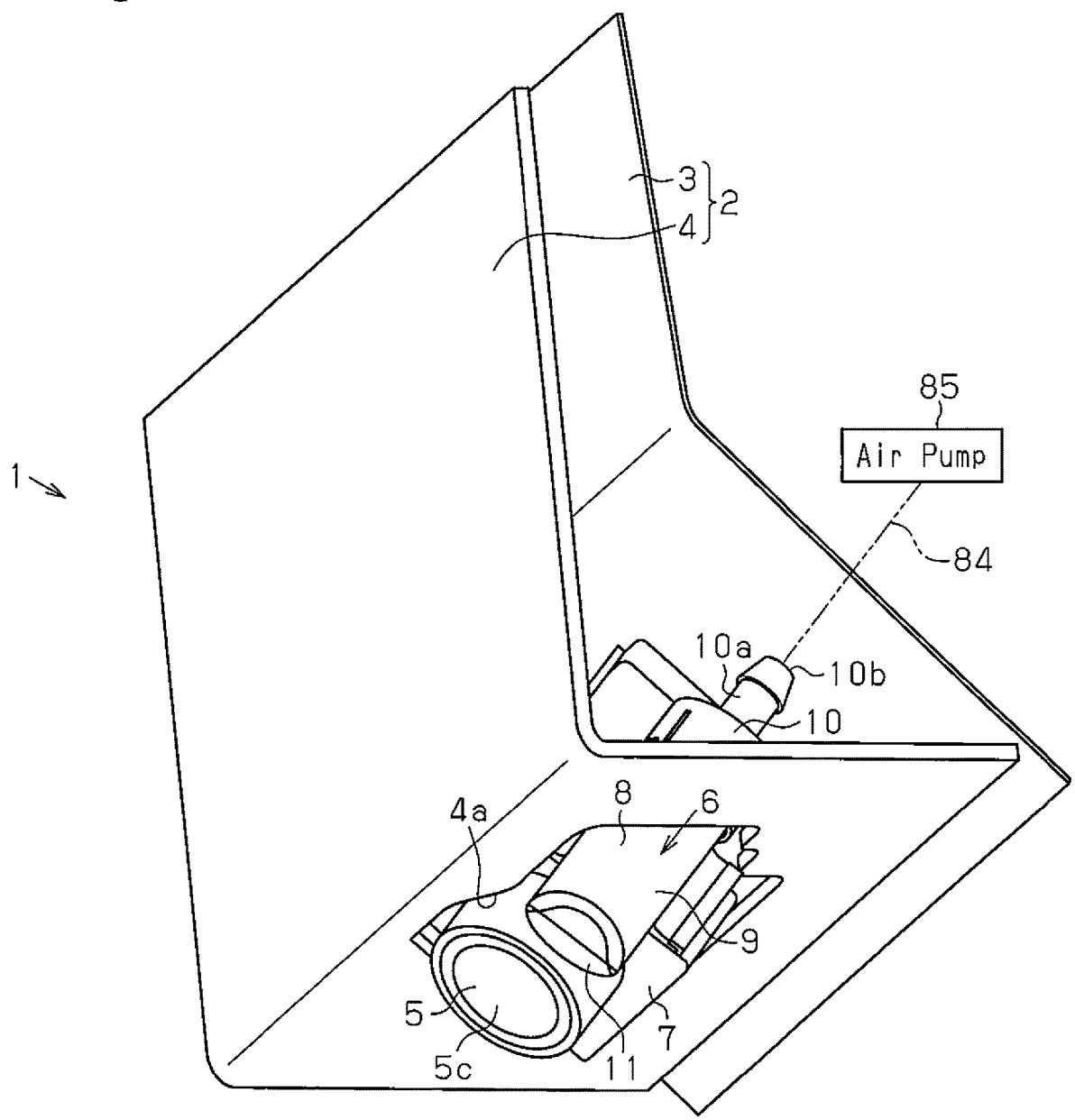
FIG. 2 is a partially schematic perspective view of the vehicle including the on-board optical sensor cleaning device shown in FIG. 1A.

As shown in FIG. 2, the back door 2 includes a metal vehicle panel 3 and a plastic garnish 4 partially covering the vehicle panel 3. The garnish 4 includes an opening 4a that opens toward the lower side. The back door 2 includes an on-board camera 5, which serves as an on-board optical sensor, and a cleaning unit 6. A portion of the on-board camera 5 and a portion of the cleaning unit 6 are exposed from the opening 4a.

Figure 3A:
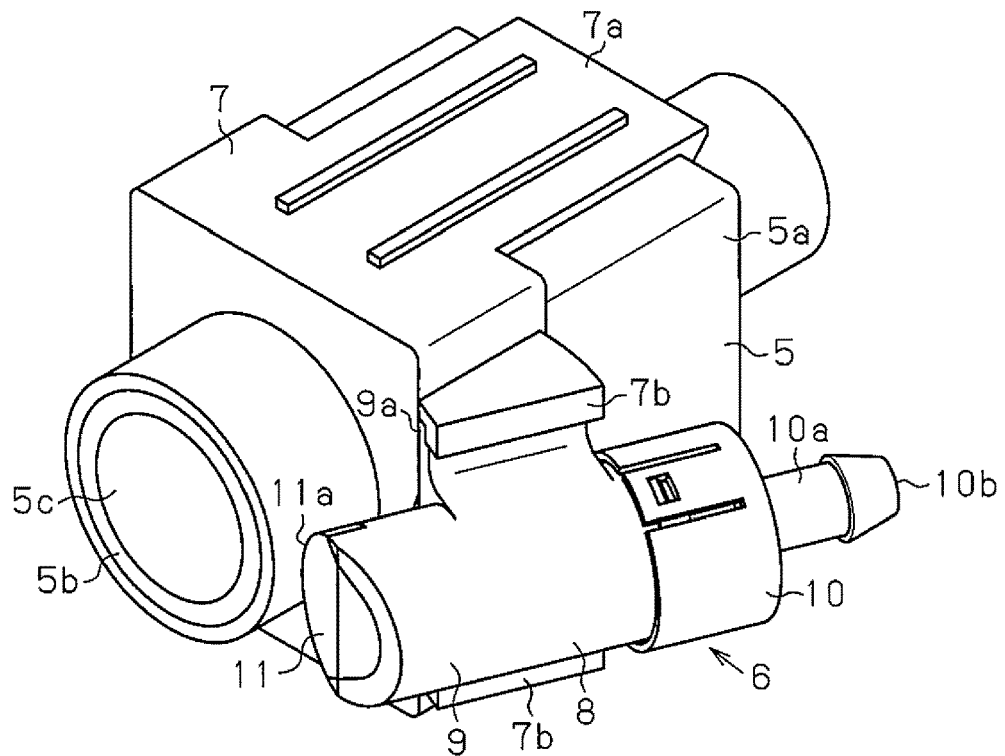
FIG. 3A is a perspective view of a cleaning unit and an on-board camera shown in FIG. 2 at a non-cleaning position.
Figure 3B:
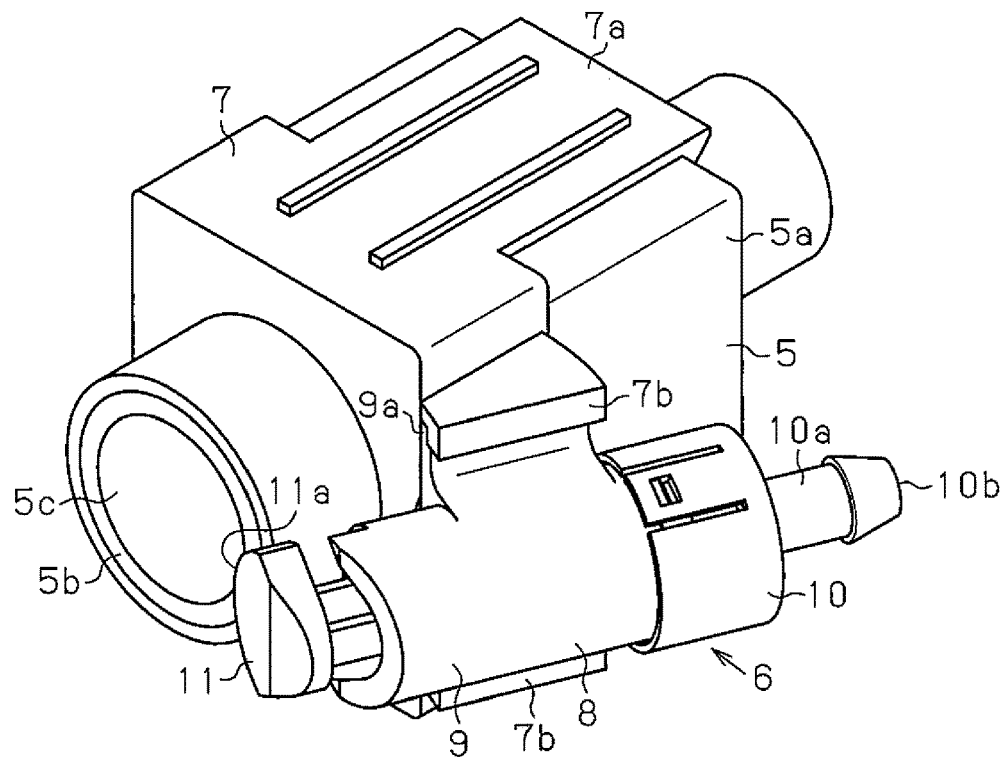
FIG. 3B is a perspective view of the cleaning unit and the on-board camera shown in FIG. 2 at a cleaning position.
Figure 4:
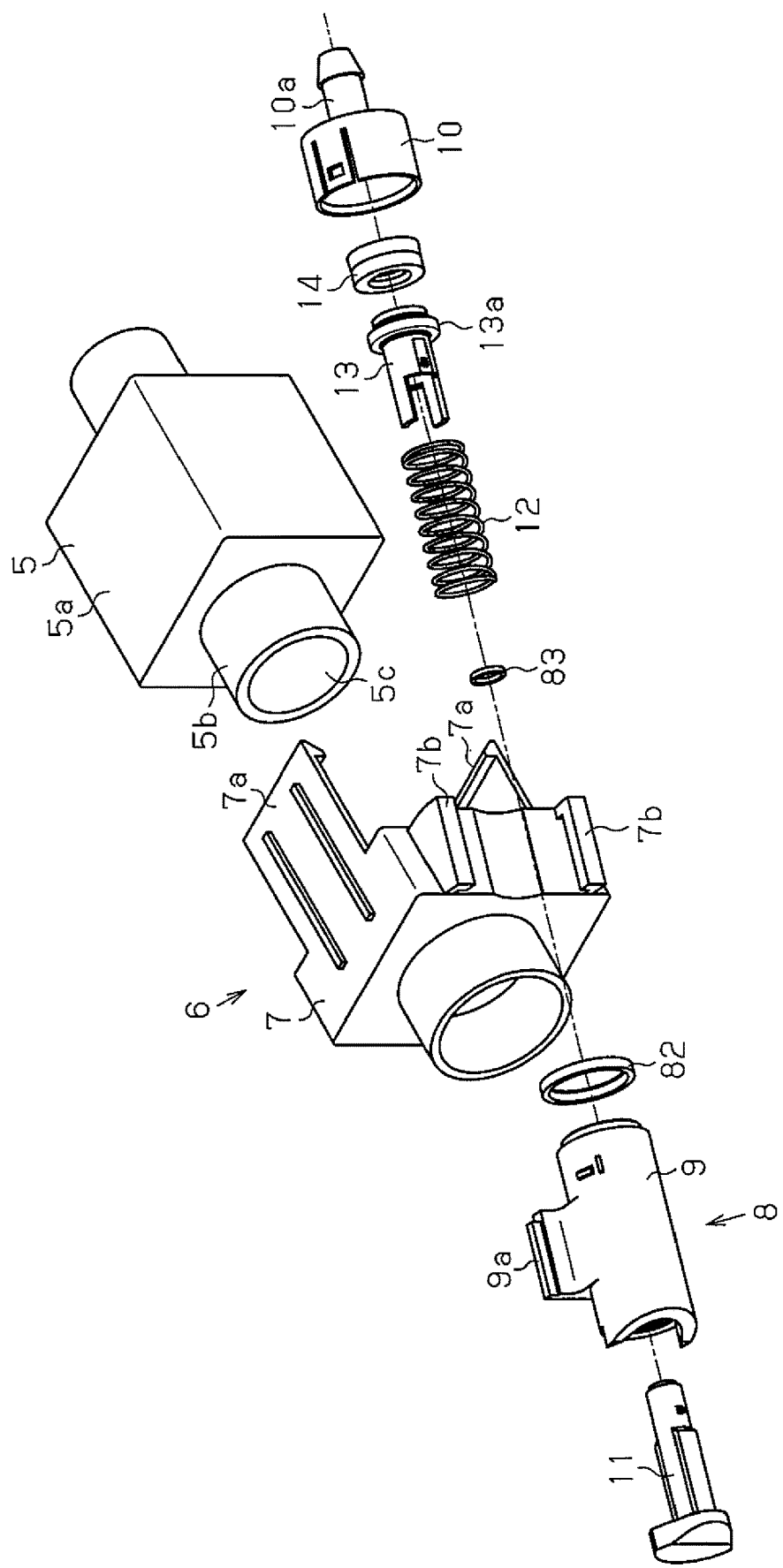
FIG. 4 is an exploded perspective view of the on-board camera and the cleaning unit shown in FIG. 3A.

As shown in FIGS. 3A to 4, the on-board camera 5 includes a generally box-shaped main body 5a, which accommodates an image capturing element (not shown), a tube 5b, which extends from one surface of the main body 5a, and a lens 5c, which covers the distal end of the tube 5b and serves as an external image capturing surface. The on-board camera 5 is fixed to the vehicle panel 3.

As shown in FIGS. 1A and 1B, for example, when a shift lever 81 of a transmission is moved to a reverse position, the on-board camera 5 transmits captured images of the rear of the vehicle 1 to a display 80, which shows the images.

As shown in FIGS. 3A to 4, the cleaning unit 6 includes a fastening member 7, which is fastened to the on-board camera 5, and a nozzle unit 8, which is fastened to the fastening member 7. The fastening member 7 includes two holding claws 7a. The fastening member 7 is fixed to the on-board camera 5 so that the holding claws 7a hold the main body 5a of the on-board camera 5. The fastening member 7 includes two fastened pieces 7b. Opposing surfaces of the fastened pieces 7b each include a groove. The nozzle unit 8 is fixed to the fastened pieces 7b.

Figure 5:
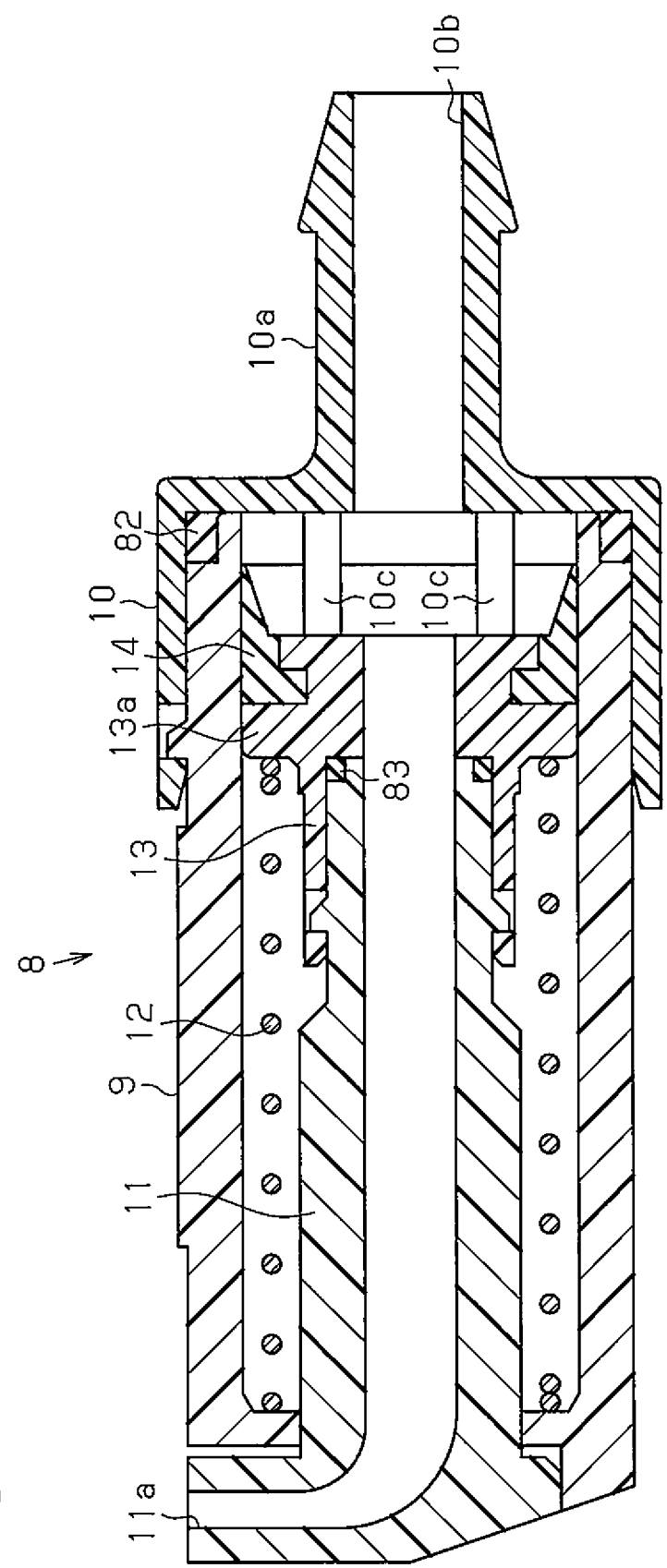
FIG. 5 is a cross-sectional view of a nozzle unit shown in FIG. 4.

As shown in FIGS. 3A to 5, the nozzle unit 8 includes a generally tubular first case 9 and a second case 10 fitted and fixed to the basal end of the first case 9. The circumference of the first case 9 includes two fastening projections 9a (only one shown in FIGS. 3A to 4). The fastening projections 9a are fitted to the grooves of the fastened pieces 7b to fix the nozzle unit 8 to the fastened pieces 7b. An inlet tube 10a is formed at the bottom of the second case 10. The inlet tube 10a projects from the bottom of the second case 10. An inlet 10b (refer to FIG. 5) is formed in the inlet tube 10a in communication with the interior of the first case 9. A seal ring 82 is held between the first case 9 and the second case 10. As shown in FIGS. 4 and 5, the nozzle unit 8 includes a nozzle 11 and a compression coil spring 12. The nozzle 11 is able to move forward and rearward relative to the first case 9 in order to move out of and into the first case 9 through a distal opening. The compression coil spring 12 biases the nozzle 11 in the rear direction (direction toward basal end of first case 9).

In detail, as shown in FIG. 5, the nozzle 11 is tubular and has a smaller diameter than the first case 9. Further, the distal portion of the nozzle 11 includes an ejection port 11a that extends sideward (direction orthogonal to longitudinal direction). A basal member 13 is fitted and fixed to the basal portion of the nozzle 11. A seal ring 83 is held between the nozzle 11 and the basal member 13. The basal member 13 includes a flange 13a extending toward the outer side in the radial direction. One end of the compression coil spring 12 is supported by the distal portion of the first case 9. The compression coil spring 12 biases the flange 13a to bias the nozzle 11 in the rearward direction (right direction as viewed in FIG. 5). An annular seal member 14, which contacts and slides along the inner circumferential surface of the first case 9, is fitted to the basal portion of the basal member 13.

Restriction rods 10c extend from the bottom of the second case 10 in a direction opposite to the inlet tube 10a. In this example, three restriction rods 10c (only two shown in FIG. 5) are formed at equal angular intervals in the circumferential direction. The restriction rods 10c contact the basal end surface of the basal member 13, which is biased by the compression coil spring 12, and restricts rearward movement of the basal member 13 (nozzle 11) from the position of contact.

As shown in FIG. 1A, a hose 84 connects an air pump 85 to the inlet tube 10a (inlet 10b). The air pump 85 is able to momentarily discharge compressed high-pressure air. Further, the air pump 85 is driven to supply the nozzle unit 8 with air from the inlet 10b. The air pump 85 is driven, for example, when a switch arranged in the passenger compartment is operated or immediately before the on-board camera 5 starts capturing images.

When compressed air is supplied from the inlet 10b to the interior of the nozzle 11, which is arranged as described above, the delivering pressure of the air biases the basal end surface of the basal member 13 and moves the nozzle 11 forward against the biasing force of the compression coil spring 12.

Forward and rearward movement of the nozzle 11 allows for movement of the ejection port 11a between a cleaning position, where the ejection port 11a is located proximate to the image capturing range center X (refer to FIG. 1B) of the on-board camera 5, and a non-cleaning position, where the ejection port 11a is located farther from the image capturing range center X than the cleaning position. The image capturing range of the present embodiment is the range in which the on-board camera 5 (image capturing element of on-board camera 5) captures images through the lens 5c and is the range shown on the display 80.

Specifically, in the present embodiment, the non-cleaning position is set where the ejection port 11a is located outside the image capturing range of the on-board camera 5 (refer to double-dashed lines in FIG. 1B). Further, the cleaning position is set where the ejection port 11a is located in the image capturing range of the on-board camera 5 (refer to solid lines in FIG. 1B). That is, when the nozzle 11 is moved toward the rear to a rear position (basal end surface of basal member 13 in contact with the restriction rods 10c), the ejection port 11a is located at the non-cleaning position outside the image capturing range of the on-board camera 5. When the nozzle 11 is moved toward the front to a front position, the ejection port 11a is located at the cleaning position inside the image capturing range of the on-board camera 5. In FIG. 1B, the solid lines indicate the background shown in the display 80 and the ejection port 11a (distal portion of nozzle 11) located in the image capturing range. Further, the double-dashed lines schematically indicate the ejection port 11a (distal portion of nozzle 11) located outside the image capturing range.

In the present embodiment, the direction in which the nozzle 11 is able to move forward and rearward is inclined relative to the direction the lens 5c of the on-board camera 5 faces toward (center axis of lens 5c). That is, when the nozzle 11 is moved forward to the front position, the ejection port 11a is located proximate to the image capturing axis (center axis of the lens 5c) and closer to the center of the image capturing range of the on-board camera 5. Further, the nozzle 11 is inclined so that cleaning liquid is ejected from the ejection port 11a to the center position of the lens 5c.

Figure 6:
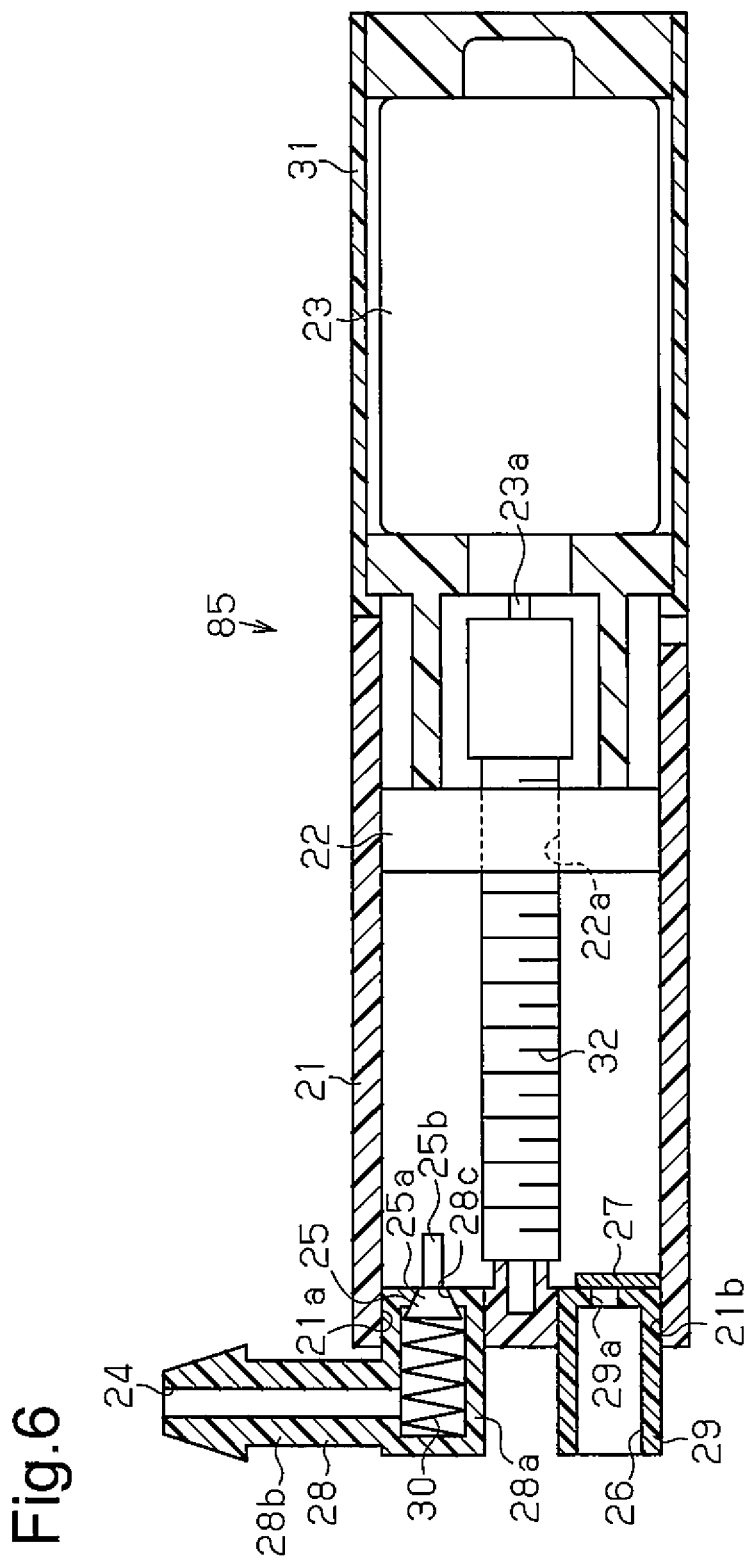
FIG. 6 is a cross-sectional view of an air pump shown in FIG. 1A.

Referring to FIG. 6, the air pump 85 of the present embodiment includes a cylinder 21, which is tubular and has a closed end, a piston 22, which is movable back and forth in the cylinder 21, and a motor 23, which serves as a drive device that drives and moves the piston 22 back and forth. Further, the air pump 85 includes a discharge port 24, which communicates the inner and outer sides of the cylinder 21, a discharge valve 25, which functions to open and close the discharge port 24, an intake port 26, which communicates the inner and outer sides of the cylinder 21, and an intake valve 27, which functions to open and close the intake port 26. In detail, the discharge valve 25 functions to open and close a tapered hole 28c, which serves as a valve port that communicates the discharge port 24 and the interior of the cylinder 21.

In detail, the bottom portion (left end as viewed in FIG. 6) of the cylinder 21 includes a discharge coupling hole 21a and an intake coupling hole 21b. A discharge member 28, which includes the discharge port 24, is fixed to the discharge coupling hole 21a, and an intake member 29, which includes the intake port 26, is fixed to the intake coupling hole 21b. The discharge member 28 and the intake member 29 function as portions of the cylinder 21.

The discharge member 28 includes a basal tube 28a and a discharge tube 28b. The basal tube 28a extends in the direction the piston 22 moves back and forth. The discharge tube 28b is in communication with the basal tube 28a, extends sideward from the distal portion of the basal tube 28a, and is connected to the hose 84. The basal portion of the basal tube 28a includes the tapered hole 28c serving as a valve port, the diameter of which decreases toward the inner side of the cylinder 21.

The discharge valve 25 includes a main body 25a, which has a trapezoidal cross-section and is able to be in planar contact with the wall of the tapered hole 28c, and an operation projection 25b, which projects from the main body 25a into the cylinder 21. The discharge valve 25 is movable in the reciprocation direction of the piston 22. Specifically, the discharge valve 25 is able to perform a closing action, in the direction in which the main body 25a comes into planar contact with the wall of the tapered hole 28c, and an opening action, in the direction in which the main body 25a moves away from the tapered hole 28c. The basal tube 28a accommodates and holds a coil spring 30, which serves as a biasing member that biases the discharge valve 25 to perform a closing action (toward right side as viewed in FIG. 6). That is, the coil spring 30 biases the discharge valve 25 in the direction in which the discharge valve 25 closes the tapered hole 28c. The characteristics of the coil spring 30 such as the spring constant is set so that compressed air does not open the discharge valve 25.

The intake member 29 is tubular and extends in the reciprocation direction of the piston 22. The basal end of the intake member 29 includes a communication hole 29a that is in communication with the interior of the cylinder 21.

A check valve, which closes the communication hole 29a from the inner side of the cylinder 21 and opens only when the pressure in the cylinder 21 becomes lower than that of the exterior, is employed as the intake valve 27.

The piston 22 is movable back and forth in the cylinder 21. The piston 22 slides in contact with the cylinder 21 with a seal member (not shown) arranged in between. Further, the piston 22 includes a female screw 22a, which extends through the piston 22 in the reciprocation direction.

The motor 23 is accommodated and held in a motor case 31. The motor case 31 is fixed to the open end of the cylinder 21 (right end as viewed in FIG. 6). A rotation shaft 23a of the motor 23 is coupled to a male screw 32, which is rotatable integrally with the rotation shaft 23a. The male screw 32 is engaged with the female screw 22a of the piston 22. Thus, when the motor 23 rotates and drives the rotation shaft 23a forward and backward, the screw effect of the male screw 32 and the female screw 22a drives and reciprocates the piston 22. As the piston 22 moves forth to narrow the void (pump chamber) in the cylinder 21 and the inner end surface of the piston 22 reaches the operation projection 25b of the discharge valve 25, the inner end surface further pushes the operation projection 25b. This opens the discharge valve 25.

The movement and operation of the on-board optical sensor cleaning device in the present embodiment will now be described.

When the air pump 85 is not driven, the nozzle 11 is moved to the rear and located at the non-cleaning position due to the biasing force of the compression coil spring 12 (FIG. 3A). Thus, the ejection port 11a (distal portion of nozzle 11) is located outside the image capturing range of the on-board camera 5. As a result, if an image is captured when cleaning is not performed, the ejection port 11a (distal portion of nozzle 11) does not obstruct the image capturing.

The air pump 85 is driven when, for example, a switch arranged in the vehicle is operated or immediately before the on-board camera 5 starts capturing images.

Specifically, when the motor 23 is driven in a standby state shown in FIG. 6, the male screw 32 rotates together with the rotation shaft 23a. The piston 22 moves forth to narrow the void (pump chamber) in the cylinder 21 shown in FIG. 7A. This compresses the air in the void (pump chamber).

Figure 7A:
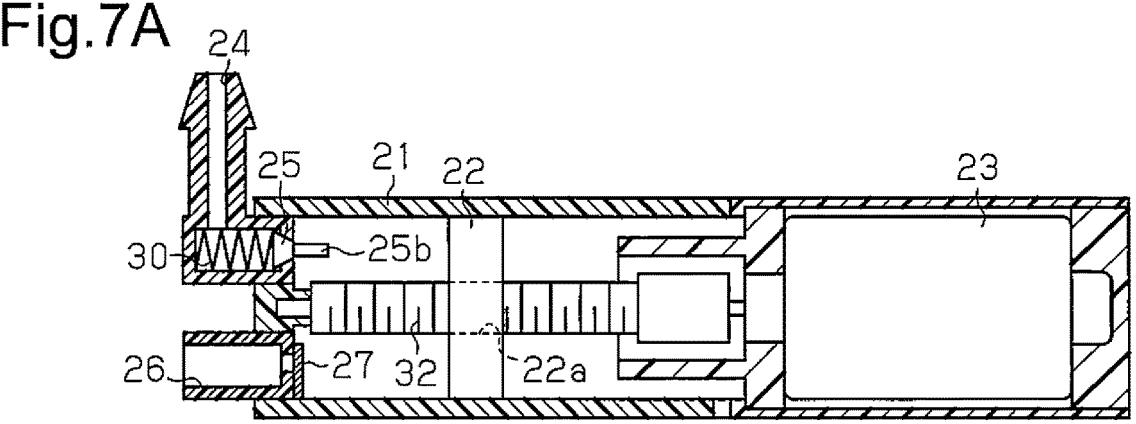
FIGS. 7A to 7D are cross-sectional views each illustrating the operation of the air pump in FIG. 6.
Figure 7B:
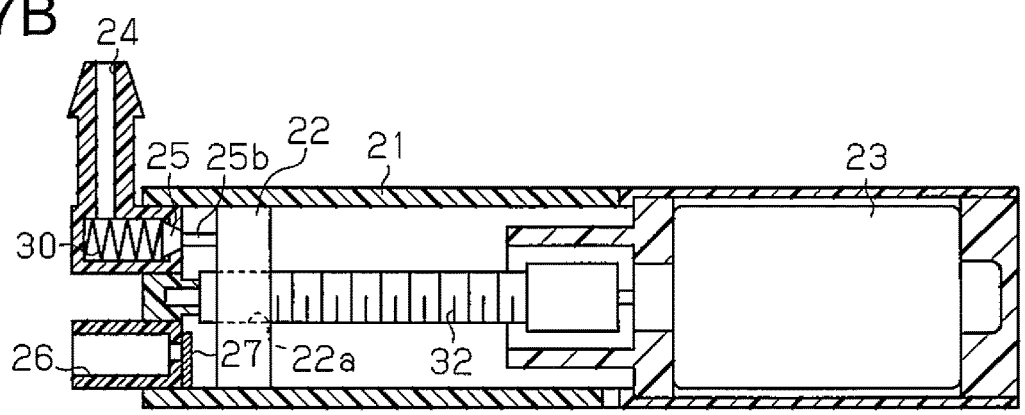
Figure 7C:
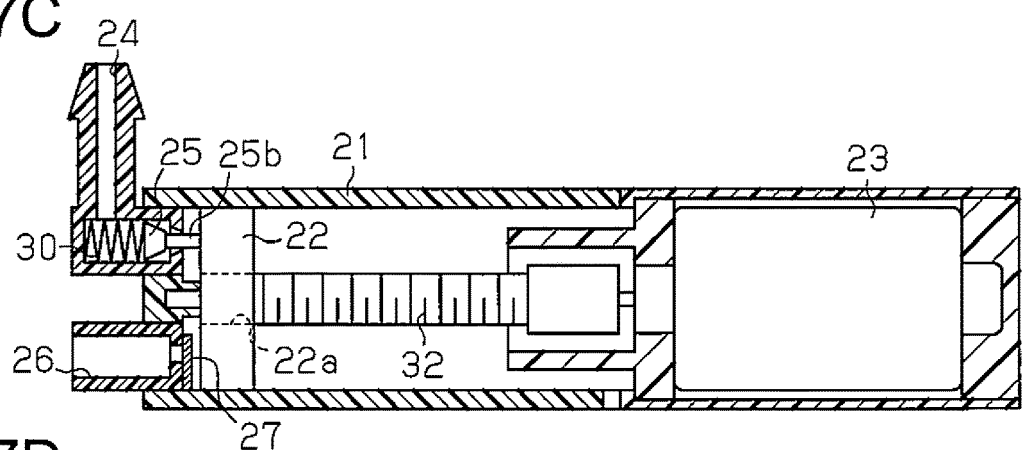

As shown in FIG. 7B, when the end surface of the piston 22 reaches the operation projection 25b, the compression of air is completed. As shown in FIG. 7C, the end surface of the piston 22 further pushes the operation projection 25b. This opens the discharge valve 25 and momentarily discharges (ejects) high-pressure air.

As a result, when the inlet 10b of the nozzle unit 8 is supplied with high-pressure air, the delivering pressure of the air moves the nozzle 11 (ejection port 11a) forward to the cleaning position (refer to FIG. 3B). This arranges the ejection port 11a in the image capturing range of the on-board camera 5. Further, air is ejected from the ejection port 11a to the lens 5c. This removes foreign material or the like from the lens 5c and performs cleaning.

Figure 7D:
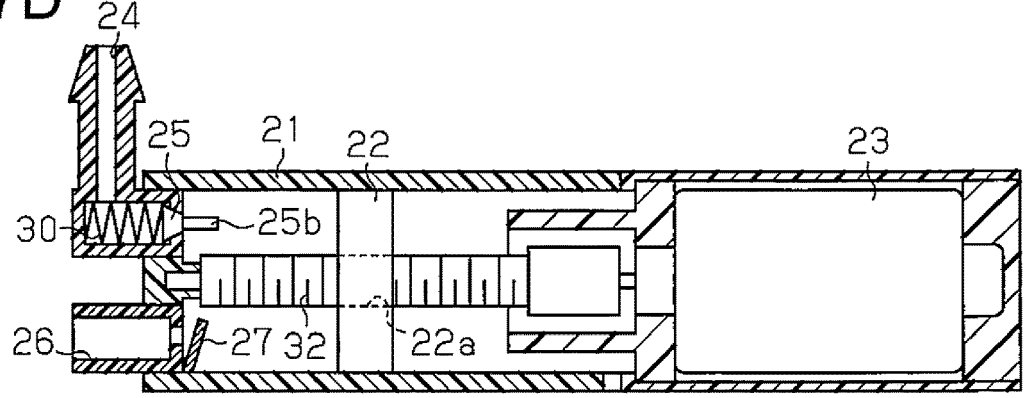

Then, as shown in FIG. 7D, when the motor 23 is driven in the opposite direction, the male screw 32 is rotated together with the rotation shaft 23a. The piston 22 moves back to enlarge the void (pump chamber) in the cylinder 21, and the pressure in the cylinder 21 becomes lower than that of the exterior. When the intake valve 27 opens and draws air into the cylinder 21, the air pump 85 returns to the standby state.

The advantages of the embodiment will now be described.

(1) The discharge valve 25 opens when operated by the piston 22 that moves forth. Thus, the discharge valve 25 does not open until operated by the piston 22. Specifically, the air pump 85 of the present embodiment includes the coil spring 30 that biases the discharge valve 25 to perform a closing action. The characteristics of the coil spring 30 are set so that compressed air does not open the discharge valve 25. Thus, the leakage of air can be prevented when the air is compressed. Further, high-pressure air of the set amount and pressure may be momentarily discharged (ejected) when the piston 22 operates the discharge valve.

Specifically, the results of an experiment shown in FIG. 8 indicate that the pressure P1 of the void (pump chamber) in the cylinder 21 of the present embodiment continuously rises until time T1 when an opening action (valve opening) occurs. Then, the pressure P1 suddenly decreases. In the present embodiment, the velocity (speed) V1 of the air ejected from the discharge port 24 is null until time T1 (opening action), and momentarily increases from time T1. In a comparison subject of the prior art, air leaks during compression. Thus, the pressure P0 does not rise that much, and the velocity V0 also does not momentarily increase.

(2) The discharge valve 25 includes the operation projection 25b, which projects into the cylinder 21. The discharge valve 25 is operated when the operation projection 25b is pushed by the piston 22. Thus, the operation projection 25b of the discharge valve 25 may easily be operated with the wide surface of the piston 22. If the discharge valve 25 does not include the operation projection 25b, a projection may be arranged on the piston 22 so that the projection pushes the discharge valve. Such a structure would need precision components and precision assembling to accurately position the projection and the discharge valve. The present embodiment allows such a situation to be avoided.

(3) The on-board optical sensor cleaning device includes the nozzle 11. The nozzle 11 is movable (forward direction) and can be moved to the cleaning position, where the ejection port 11a is located proximate to the image capturing range center X of the on-board optical sensor, by the delivering pressure of the air discharged from the air pump 85. Since the nozzle 11 can be moved to the cleaning position only when cleaning is performed, the lens 5c may be cleaned in a favorable manner without obstructing image capturing. Further, since the nozzle 11 can be moved (forward) by the delivering pressure of the air discharged from the air pump 85, there is no need for an electric drive device or the like to enable movement (forward direction) of the nozzle 11. This allows for the structure to be simplified. Further, the air pump 85 allows for momentary discharge (ejection) of high-pressure air of the set amount and pressure. Thus, the nozzle 11 can be moved to a further accurately set cleaning position, and the lens 5c may be cleaned in a further favorable manner.

(4) The air pump 85 includes the motor 23, which is used to drive and reciprocate the piston 22. This allows the air pump 85 to be accurately driven by, for example, a control signal or the like.

(5) The screw effect of the male screw 32 and the female screw 22a, which is produced by driving the rotation shaft 23a to rotate forward and backward, drives and reciprocates the piston 22. Thus, the piston 22 and the motor 23 (rotation shaft 23a) may be arranged in series in the reciprocation direction of the piston 22. Further, enlargement of the air pump 85 in a direction orthogonal to the reciprocation direction of the piston 22 may easily be limited.

The above embodiment may be modified as described below.

In the above embodiment, the discharge valve 25 includes the operation projection 25b, which projects into the cylinder 21. The discharge valve 25 may be changed to another structure as long as the structure opens when operated by a piston that moves forth.

Figure 9:
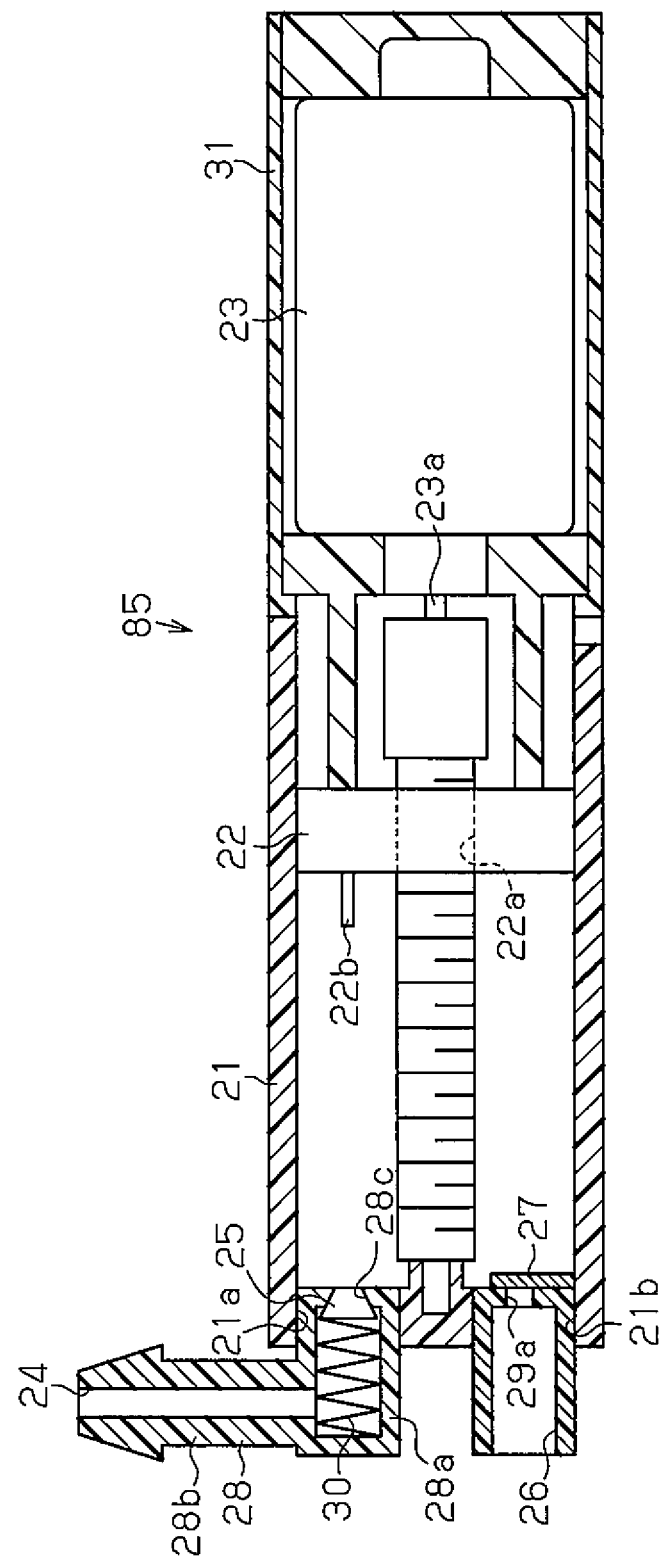
FIG. 9 is a cross-sectional view of an air pump in a further example.

For example, as shown in FIG. 9, the operation projection 25b may be omitted from the discharge valve 25, and a projection 22b may be located on the piston 22. The projection 22b projects toward the discharge valve 25 to operate the discharge valve 25. In detail, the projection 22b is sized to enter the tapered hole 28c.

In the above embodiment, the piston 22 is reciprocated by the screw effect of the male screw 32 and the female screw 22a. The piston 22 may be reciprocated by another structure.

Figure 10A:
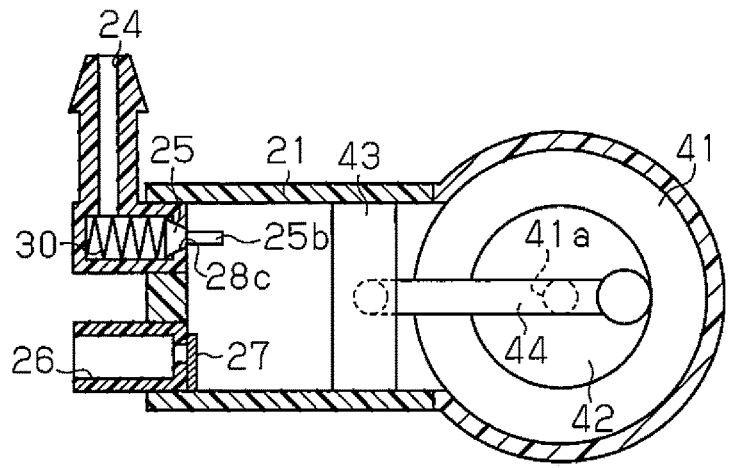
FIGS. 10A to 10C are cross-sectional views each illustrating the operation of an air pump in a further example.
Figure 10B:
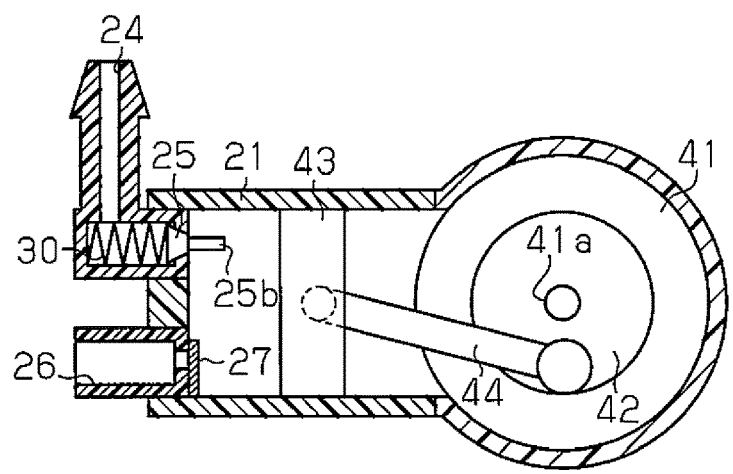
Figure 10C:
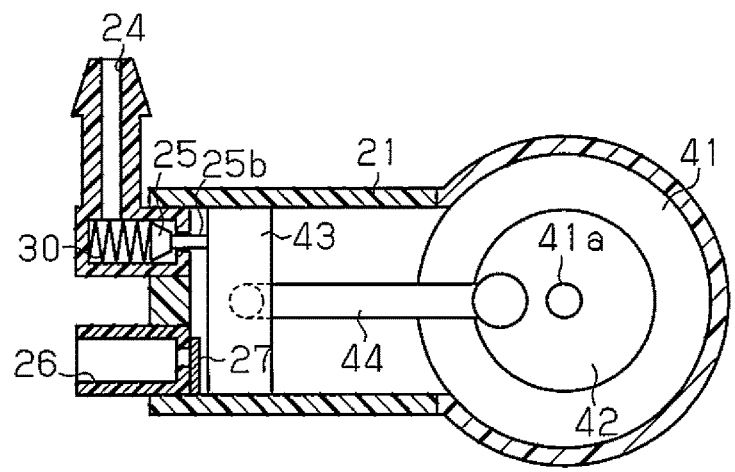

For example, as shown in FIGS. 10A to 10C, a crank plate 42 is fixed to a rotation shaft 41a of a motor 41, which serves as an electric drive device. A rod 44 connects a radially outer portion of the crank plate 42 and a piston 43. Rotation of the crank plate 42 reciprocates the piston 43 in the order of FIGS. 10A to 10C. This would also obtain the same advantages as the above embodiment.

In the above embodiment, the nozzle 11 can be moved forward and rearward. The nozzle 11 may also be movable in directions other than the forward and rearward directions and be, for example, pivoted by the delivering pressure of a fluid including air.

The on-board optical sensor cleaning device of the above embodiment ejects only air, which is delivered from the air pump 85, to clean the lens 5c. Instead, for example, the air delivered from the air pump 85 and ejected to the lens 5c may be mixed with a cleaning liquid delivered from a washer pump. Further, the air pump 85 may be an electric pump including a liquid inlet. Washer liquid from the washer pump may be drawn through the liquid inlet into a void between a valve port and a discharge port. The fluid of the mixture of the washer liquid and air is discharged (emitted) from the discharge port.

FIGS. 11 to 14 show an example of such an electric pump. A discharge member 51 is fixed to the discharge coupling hole 21a of an electric pump 86 in lieu of the discharge member 28.

The basal end of the discharge member 51 is fixed to the discharge coupling hole 21a. The discharge member 51 includes a liquid reservoir tube 51a, which extends in the reciprocation direction of the piston 22, and a discharge tube 51b, which further extends from the distal end of the liquid reservoir tube 51a in the reciprocation direction of the piston 22. The liquid reservoir tube 51a is in communication with the discharge tube 51b. The hose 84 is connected to the discharge tube 51b. The discharge tube 51b has a smaller diameter than that of the liquid reservoir tube 51a. The interior of the liquid reservoir tube 51a defines a liquid reservoir 52, and the discharge tube 51b includes an opening that defines a discharge port 53.

The basal portion of the liquid reservoir tube 51a includes a tapered hole 51c serving as a valve port in which the diameter decreases toward the inner side of the cylinder 21.

Further, the liquid reservoir tube 51a (liquid reservoir 52) accommodates and holds the discharge valve 25 and the coil spring 30 in the same manner as the above embodiment.

A liquid inlet tube 51d is formed beside the liquid reservoir tube 51a and extends sideward from the liquid reservoir tube 51a. The liquid inlet tube 51d is in communication with the liquid reservoir tube 51a and has an open end defining a liquid inlet 51e leading to the liquid reservoir 52 in the liquid reservoir tube 51a. The liquid inlet tube 51d (liquid inlet 51e) is connected to a washer pump 88, which delivers washer liquid from a washer tank 87 through the liquid inlet 51e into the liquid reservoir 52. In this example, a washer hose 89 connects the washer pump 88 to the liquid inlet tube 51d.

A fluid check valve 54 is arranged on the liquid inlet 51e to permit the flow of washer liquid into the liquid reservoir 52, which is the void between the tapered hole 51c and the discharge port 53, and prevent a reversed flow of fluid from the liquid reservoir 52. The fluid check valve 54 closes the liquid inlet 51e from the inner side of the liquid reservoir 52 and opens when the pressure of the washer liquid delivered from the washer pump 88 becomes higher than the internal pressure of the liquid reservoir 52.

A holding valve 55 is arranged in a portion of the liquid reservoir 52 that is proximate to the discharge port 53. The holding valve 55 prevents the outflow of the washer liquid from the discharge port 53 when the discharge valve 25 is closed. Further, the holding valve 55 opens when the discharge valve 25 opens. In detail, an annular projection 52a projects from a portion of the liquid reservoir 52 proximate to the discharge port 53 to reduce the inner diameter. A coil spring 56 biases the holding valve 55 from the portion of the liquid reservoir 52 proximate to the discharge port 53 toward the annular projection 52a. The holding valve 55 prevents the outflow of washer liquid when the discharge valve 25 is closed and opens when the discharge valve 25 opens and suddenly increases the pressure of the liquid reservoir 52.

Figure 11:
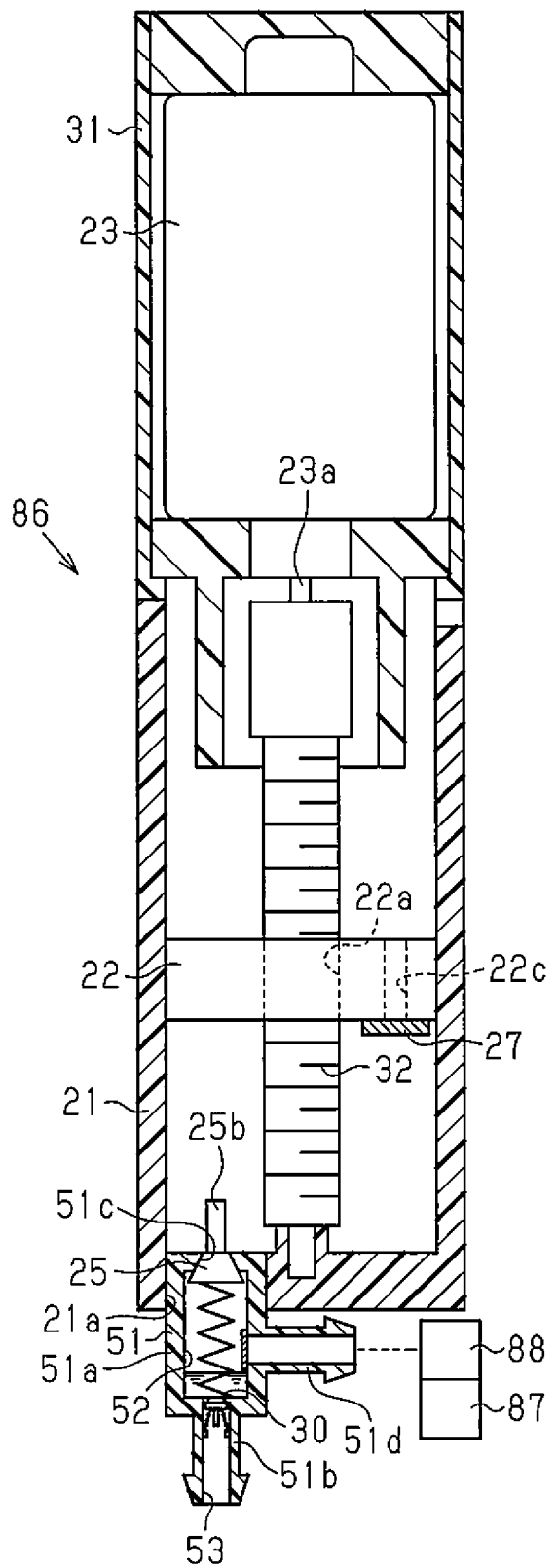
FIG. 11 is a cross-sectional view of an electric pump in a further example.
Figure 12:
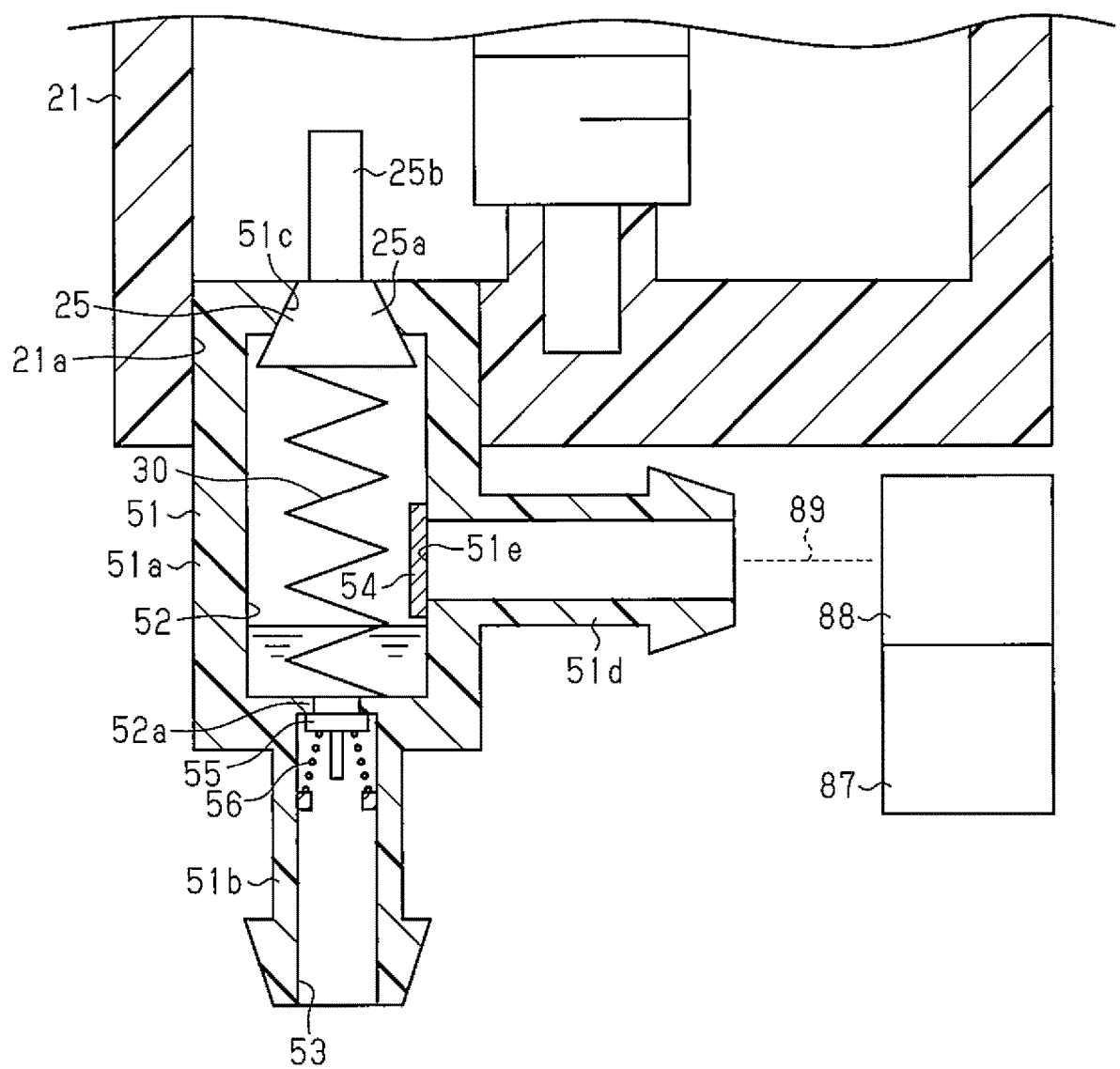
FIG. 12 is a partially enlarged cross-sectional view of the electric pump in the further example.

As shown in FIG. 11, the electric pump 86 of the example does not include the intake coupling hole 21b and the intake member 29. The piston 22 includes an intake passage 22c, which communicates the inner and outer sides of the cylinder 21 (pump chamber), and the intake valve 27, which is arranged on the intake passage 22c and functions in the same manner as the above embodiment.

In the electric pump 86 having such a structure, if the motor 23 (refer to FIG. 11) is driven when washer liquid is stored beforehand in the liquid reservoir 52, the piston 22 is moved forth to narrow the void (pump chamber) in the cylinder 21.

Figure 13:
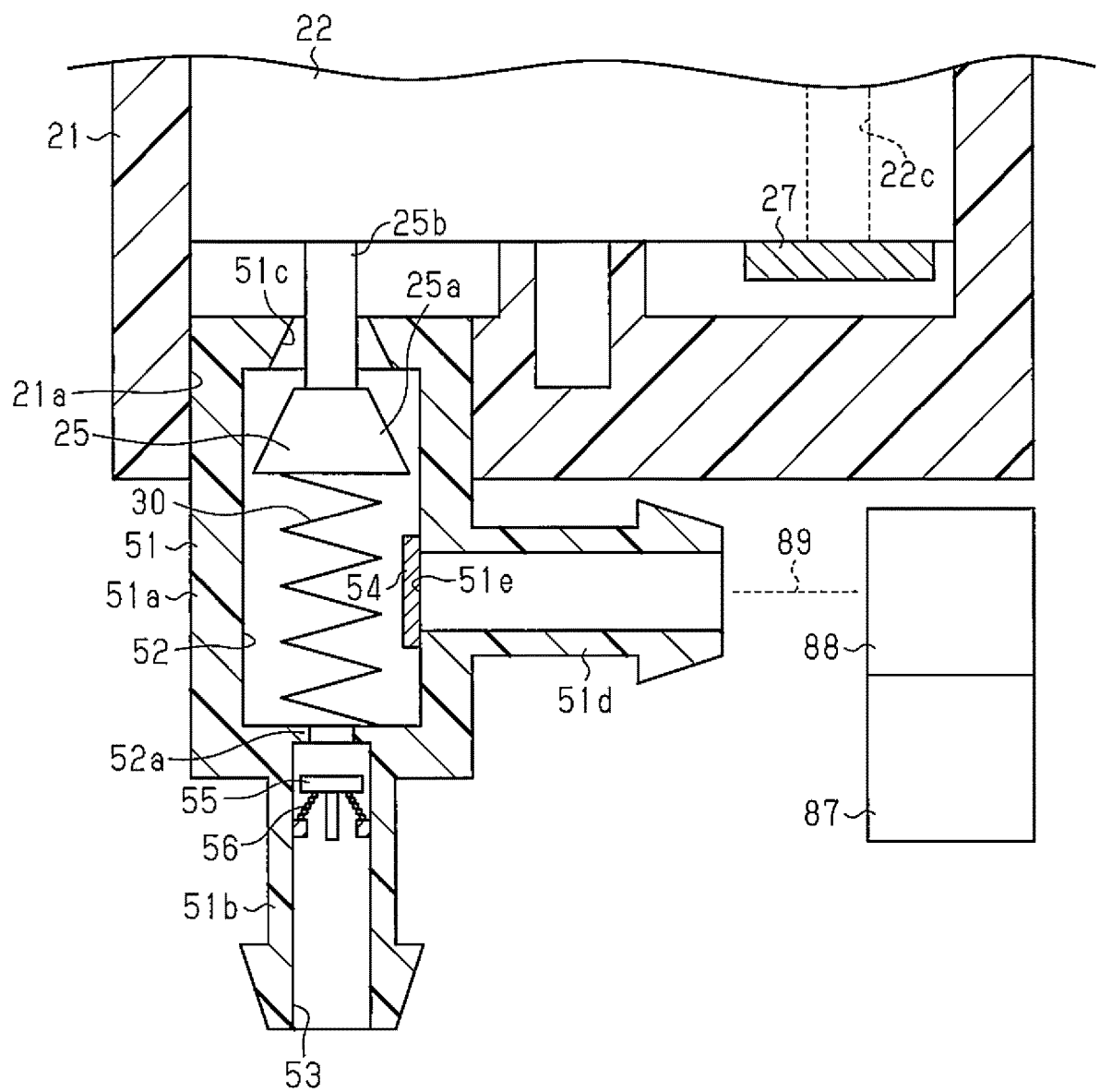
FIG. 13 is a partially enlarged cross-sectional view illustrating the operation of the electric pump in the further example.

As shown in FIG. 13, the end surface of the piston 22 pushes the operation projection 25b of the discharge valve 25 and opens the discharge valve 25 to momentarily discharge (eject) high-pressure air from the tapered hole 51c. This opens the holding valve 55 and discharges (ejects) fluid, which is a mixture of the washer liquid and air in the liquid reservoir 52, from the discharge port 53. The fluid, which is a mixture of the washer liquid and air, is ejected to the lens 5c from the ejection port 11a of the nozzle 11 to remove foreign material or the like from the lens 5c and perform cleaning.

Figure 14:
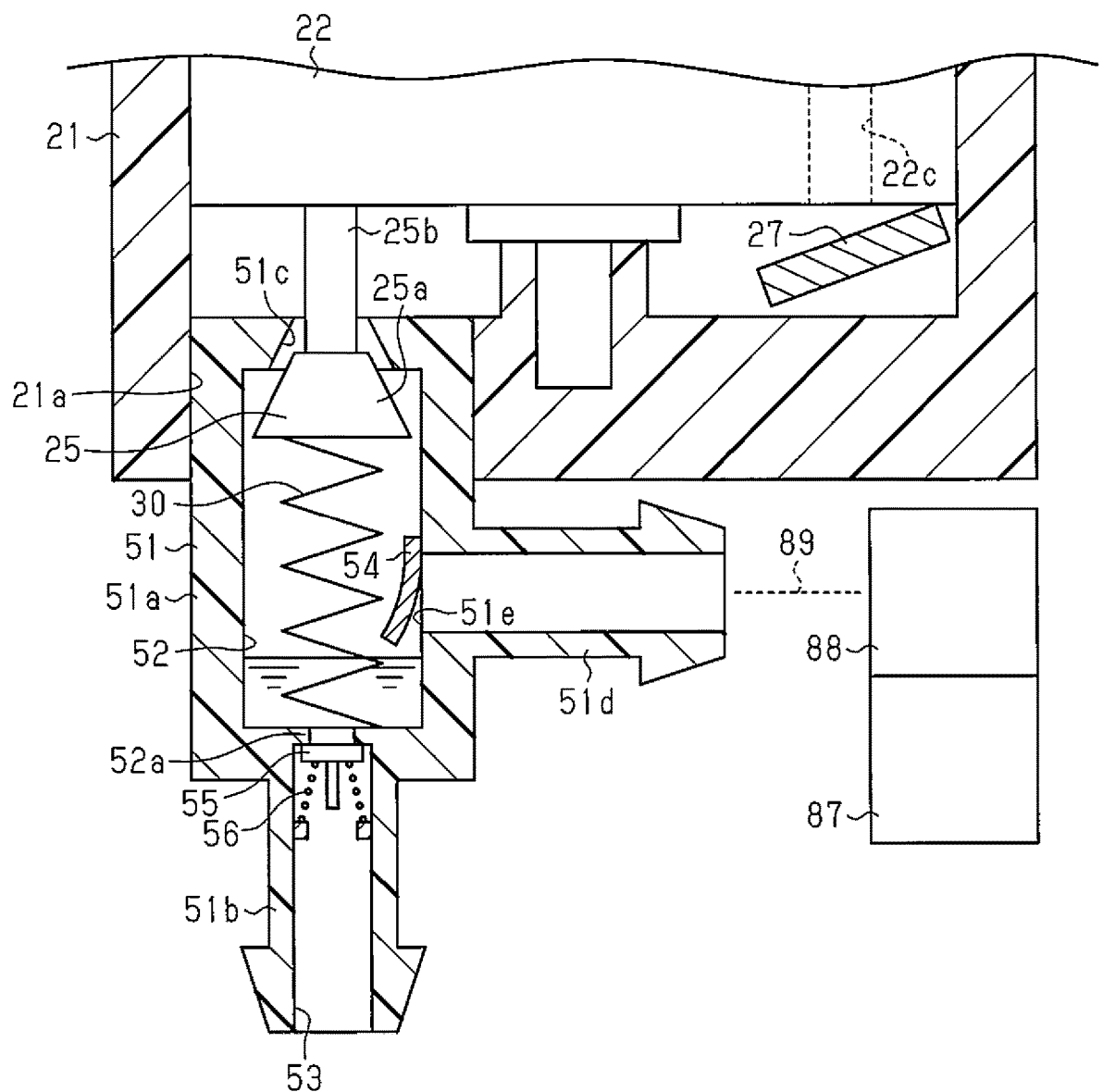
FIG. 14 is a partially enlarged cross-sectional view illustrating the operation of the electric pump in the further example.

As shown in FIG. 14, when the motor 23 (refer to FIG. 11) is driven in the opposite direction, the piston 22 moves back to enlarge the void (pump chamber) in the cylinder 21. The intake valve 27 opens when the pressure in the cylinder 21 becomes lower than that of the exterior. Air is drawn into the cylinder 21 through the intake valve 27. This returns the electric pump 86 to the standby state. Further, in this state, as shown in FIG. 14, the washer pump 88 is driven when the piston 22 opens the discharge valve 25. This delivers washer liquid from the washer tank 87 to the liquid reservoir 52. The washer liquid is stored in the liquid reservoir 52.

In the electric pump 86 (on-board optical sensor cleaning device) configured in this manner, the liquid inlet 51e, which allows for washer liquid to be drawn in, is formed between the tapered hole 51c (valve port) and the discharge port 53. This allows for the discharge (ejection) of fluid, which is a mixture of the washer liquid and air, from the discharge port 53.

Further, the liquid inlet 51e includes the fluid check valve 54, which permits the flow of the washer liquid into between the tapered hole 51c and the discharge port 53, and prevents a reversed flow of fluid. Thus, reversed flow of fluid (washer liquid and air) from the liquid inlet 51e is restricted. This limits decreases in the amount of fluid that would be caused by, for example, a reversed flow.

The liquid reservoir 52 that is capable of storing the washer liquid drawn through the liquid inlet 51e is located between the tapered hole 51c and the discharge port 53. Thus, by accumulating washer liquid beforehand in the liquid reservoir before the discharge valve 25 opens, the washer liquid may be mixed with air in a favorable manner.

The holding valve 55 is located in a portion of the liquid reservoir 52 proximate to the discharge port 53. The holding valve 55 prevents the outflow of washer liquid from the discharge port 53 when the discharge valve 25 is closed, and opens when the discharge valve 25 opens. This prevents the outflow of washer liquid from the discharge port 53 before the discharge valve 25 opens and ensures that air is mixed with the washer liquid.

Further, the tapered hole 51c, the discharge port 53, and the liquid reservoir 52 are arranged along a straight line. Thus, less pressure is lost compared to when, for example, the tapered hole 51c, the liquid reservoir 52, and the discharge port 53 are arranged in a curved layout.

This example (refer to FIGS. 11 to 14) includes the fluid check valve 54. However, the fluid check valve 54 is not necessary. Further, this example includes the liquid reservoir 52. However, the liquid reservoir 52 is not necessary. Moreover, this example includes the holding valve 55. However, the holding valve 55 is not necessary. For example, the washer pump 88 may be driven when opening the discharge valve 25. Such a structure allows fluid, which is a mixture of the washer liquid and air, to be discharged (ejected) from the discharge port 53.

Further, in this example, the tapered hole 51c (valve port), the liquid reservoir 52, and the discharge port 53 are arranged along a straight line. However, the tapered hole 51c, the liquid reservoir 52, and the discharge port 53 may be arranged in a curved layout.

Figure 15:
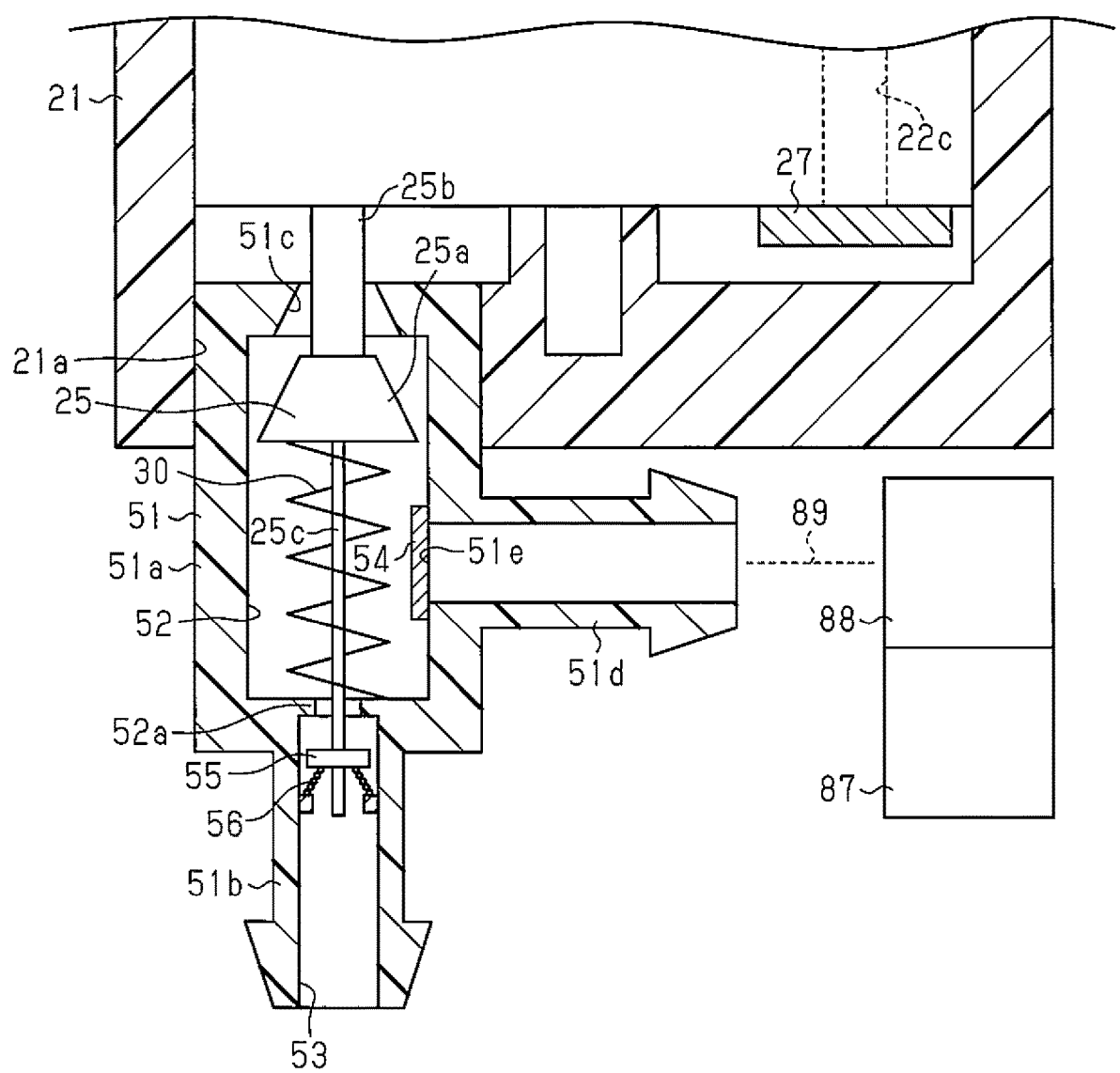
FIG. 15 is a partially enlarged cross-sectional view of an electric pump in a further example.

In this example, the holding valve 55 opens if the pressure of the liquid reservoir 52 suddenly increases when the discharge valve 25 opens. Instead, for example, as shown in FIG. 15, the discharge valve 25 may include an operation rod 25c to operate (push) the holding valve 55 when the discharge valve 25 opens. This opens the holding valve 55.

In the above embodiment, the air pump 85 (discharge port 24) and the nozzle unit 8 (nozzle 11) are simply connected by the hose 84. Instead, for example, the air pump 85 and the nozzle unit 8 may be connected by a mixing member including a liquid inlet allowing for washer liquid to be drawn in.

Figure 16:
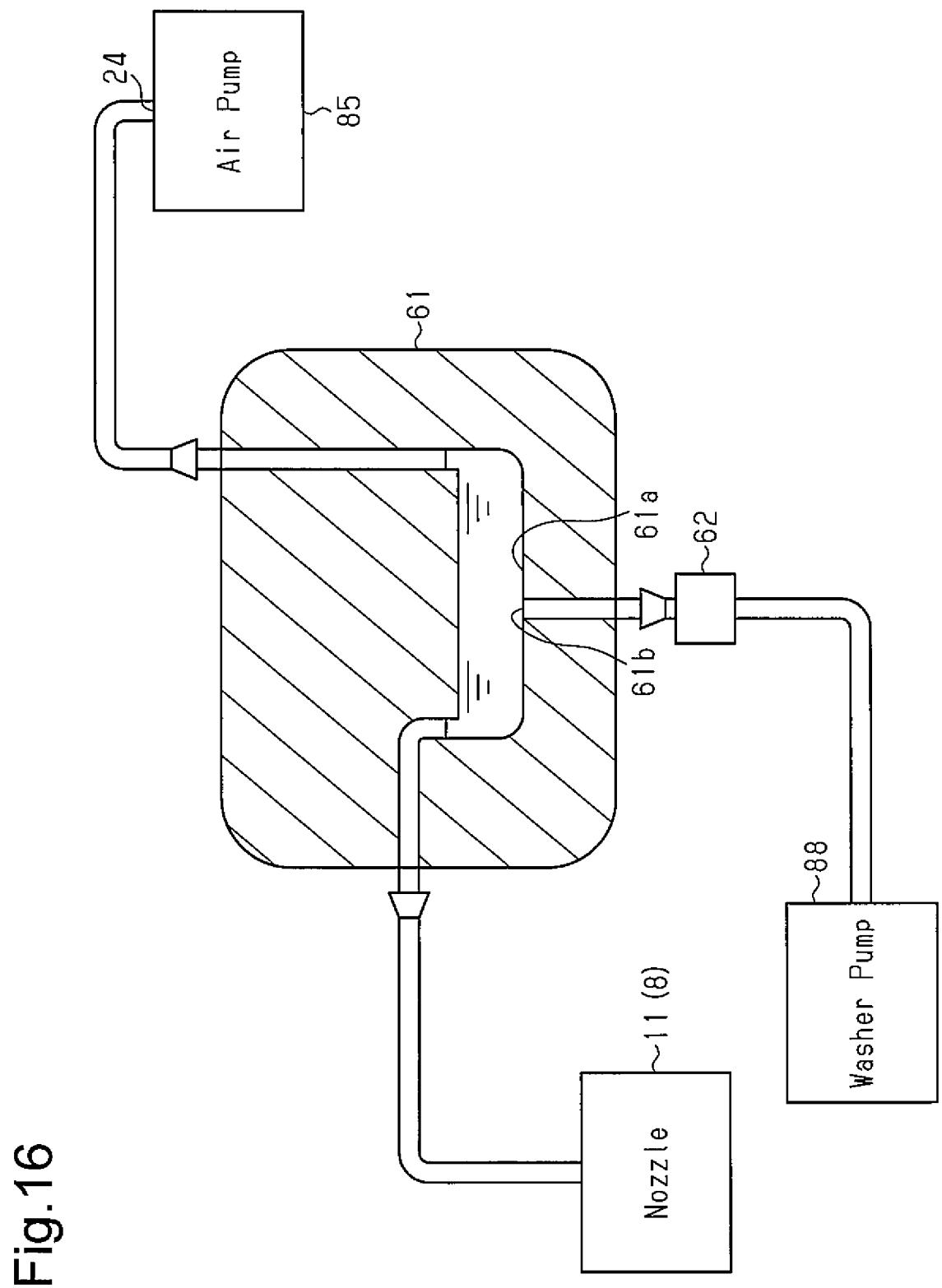
FIG. 16 is a schematic diagram of the on-board optical sensor cleaning device in the further example.

For example, a modification may be made as shown in FIG. 16. The on-board optical sensor cleaning device of this example includes the air pump 85, which serves as the electric pump in the above embodiment, and the nozzle 11 (nozzle unit 8). A mixing member 61 connects the discharge port 24 (air pump 85) and the nozzle 11 (nozzle unit 8).

The mixing member 61 includes a line communicating the discharge port 24 and the nozzle 11. The line includes a liquid reservoir 61a that is able to store washer liquid with gravity. The mixing member 61 includes a liquid inlet 61b through which washer liquid can be drawn at a position corresponding to the liquid reservoir 61a. A fluid check valve 62 connects the liquid inlet 61b to the washer pump 88 to permit the entrance of washer liquid and prevent a reversed flow of fluid.

This allows for the ejection of fluid, which is a mixture of the washer liquid and air, from the ejection port 11a of the nozzle 11 (refer to FIG. 5) in the same manner as the above example (refer to FIGS. 11 to 14). Thus, the lens 5c (refer to FIG. 1) may be cleaned in a favorable manner.

In this example (refer to FIG. 16), the washer pump 88 is driven at the same time as when the air pump 85 (motor 23) is driven and controlled to deliver the washer liquid into the liquid reservoir 61a before the discharge valve 25 opens.

Figure 17:
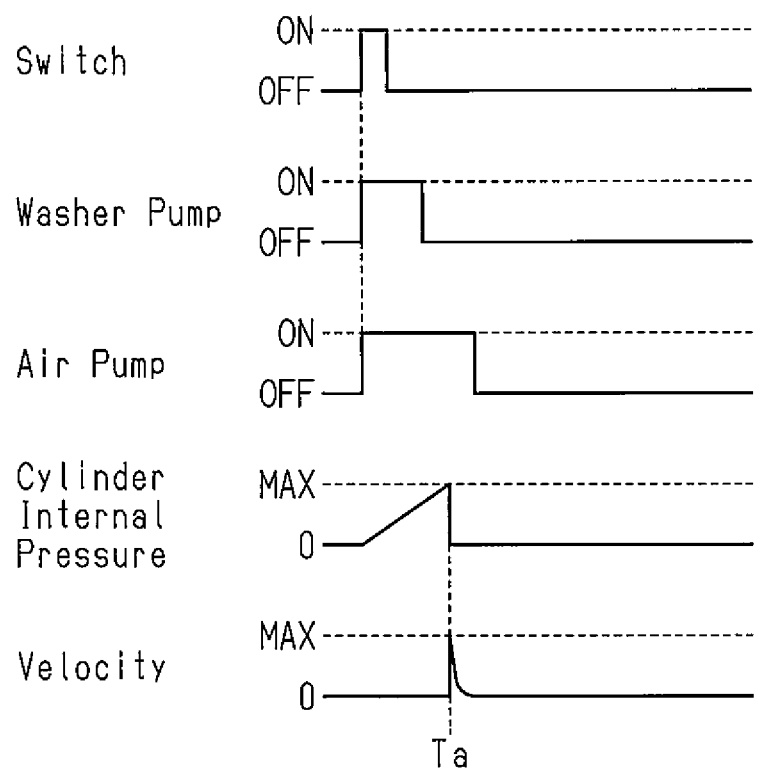
FIG. 17 is a time chart showing the operation of a washer pump and an air pump in the further example.

Specifically, for example, as shown in FIG. 17, when a switch in the vehicle is operated (ON), the washer pump 88 is driven (ON) at the same time as when the air pump 85 (motor 23) is driven (ON). The washer pump 88 delivers a preset amount of washer liquid to the liquid reservoir 61a before when the discharge valve 25 opens at time Ta, that is, before the pressure and velocity in the cylinder becomes maximal. In FIG. 17, when the air pump 85 goes on, the motor 23 produces forward rotation to move forth the piston 22.

As a result, the air pump 85 (motor 23) is readily driven, and the washer liquid is accumulated in the liquid reservoir 61a before the discharge valve 25 opens. This mixes the washer liquid with air in a favorable manner. Thus, the delivery of the washer liquid is performed (completed) when the piston 22 is compressing the air in the cylinder 21. The time from when, for example, the switch is operated to when ejection occurs may be shortened, and a fluid obtained by mixing air and the washer liquid in a favorable manner can be ejected.

The washer pump 88 may also be controlled to be driven for a preset time before the air pump 85 (motor 23) is driven.

Figure 18:
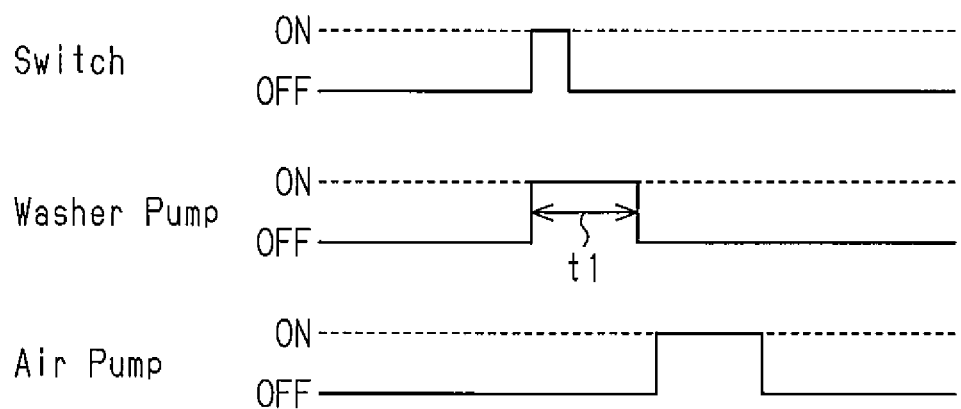
FIG. 18 is a time chart showing the operation of the washer pump and the air pump in the further example.

More specifically, for example, as shown in FIG. 18, when a switch in the vehicle is operated (ON), the washer pump 88 is driven (ON) for a preset time t1 before the air pump 85 (motor 23) is driven. After the washer pump 88 is stopped, the air pump 85 is driven (ON).

As a result, the air pump 85 (motor 23) is driven so that the accumulation of the washer liquid in the liquid reservoir 61a is further ensured before the discharge valve 25 opens, and the washer liquid is mixed with air in a favorable manner.

Further, the washer pump 88 may be controlled to be driven for a preset time after the discharge valve 25 opens.

Figure 19:
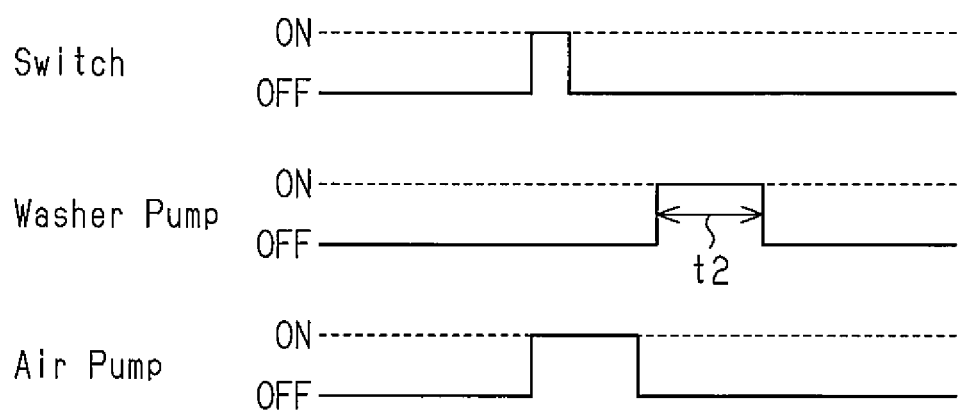
FIG. 19 is a time chart showing the operation of the washer pump and the air pump in the further example.

More specifically, for example, as shown in FIG. 19, when a switch in the vehicle is operated (ON), the air pump 85 (motor 23) is driven (ON) and the discharge valve 25 opens. After the discharge valve 25 opens, the washer pump 88 is driven (ON) for a preset time t2.

As a result, after ejecting fluid (washer liquid and air) from the ejection port 11a of the nozzle 11, the washer liquid can be accumulated in the liquid reservoir 61a. Thus, when fluid (washer liquid and air) is ejected from the ejection port 11a of the nozzle 11 the next time, the washer liquid may be mixed with air even when readily driving the air pump 85 (motor 23). Such controls (refer to FIGS. 17 to 19) may be executed in the same manner on the electric pump 86 of the above examples (FIGS. 11 to 15).

In the above embodiment, the air pump 85 includes a mechanism that converts the rotational motion, which is produced by the motor 23, to linear motion with the screw effect. The air pump 85 may further include a speed reduction mechanism that reduces the speed of the rotation produced by the motor and transmitted to the piston.

Figure 20:
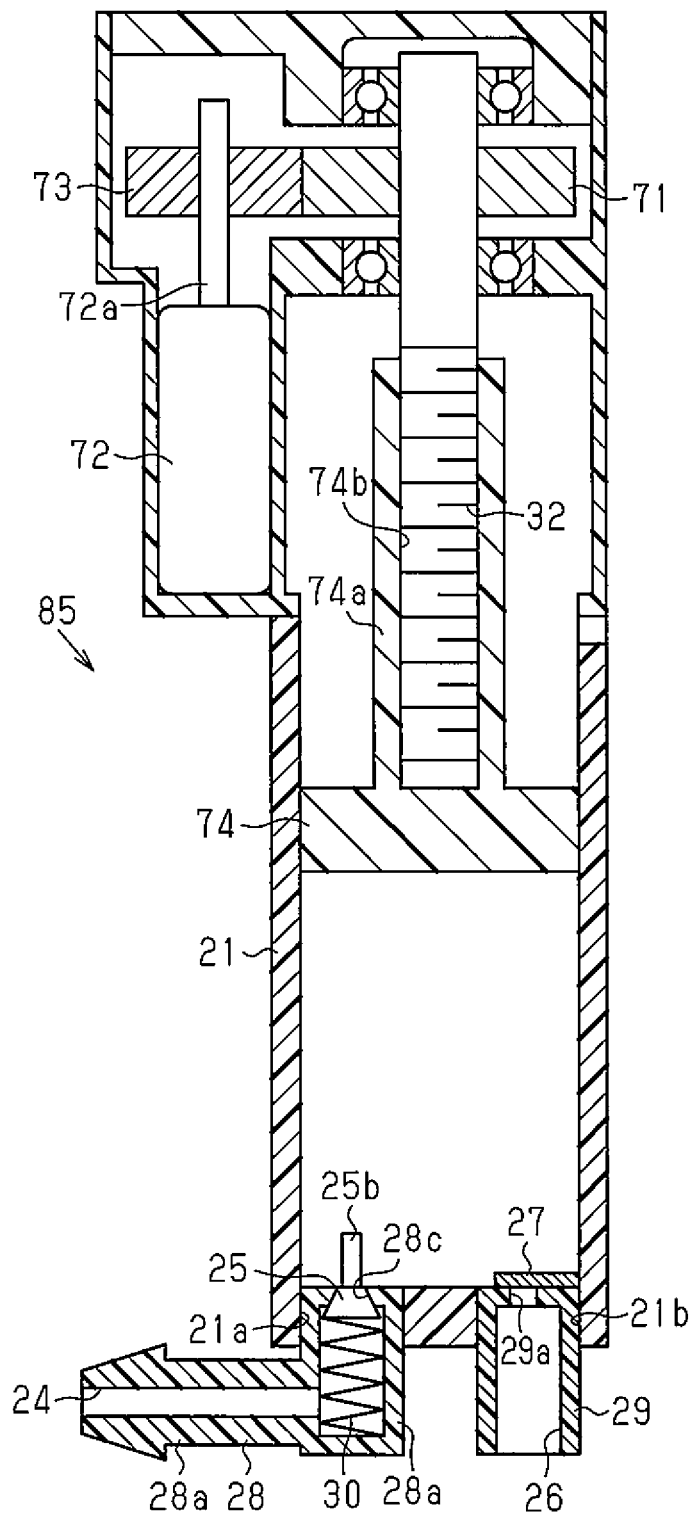
FIG. 20 is a cross-sectional view of an air pump in a further example.

FIG. 20 shows an example of an air pump 85 that includes a speed reduction mechanism. A large-diameter gear 71 is fitted and fixed onto the male screw 32. A small-diameter gear 73 is fitted and fixed onto a rotation shaft 72a of a motor 72. The large-diameter gear 71 and the small-diameter gear 73 are engaged with each other. In this example, the large-diameter gear 71 and the small-diameter gear 73 form the speed reduction mechanism. Further, in this example, a piston 74 does not include a female screw 22a extending through the piston 74 like in the above embodiment but includes a tube 74a extending outside the cylinder 21 (pump chamber). The inner circumferential surface of the tube 74a forms a female screw 74b, which is engaged with the male screw 32.

As a result, the speed reduction mechanism (large-diameter gear 71 and small-diameter gear 73) allows the size of the motor (output reduction) to be reduced.

In the above embodiment, the motor 23 (rotation shaft 23a) is driven in a direction that is opposite to when moving the piston 22 forth in order to move the piston 22 back and enlarge the void (pump chamber) in the cylinder 21. Instead, the piston 22 may be moved back by the biasing force of a back movement biasing member (coil spring or the like). As a result, when the motor 23 is deactivated, the biasing force of the biasing member moves back the piston and returns the air pump 85 to the standby state.

In the above embodiment and examples, the air pump 85 and the electric pump 86 are parts of the on-board optical sensor cleaning device. Instead, the air pump 85 and the electric pump 86 may be used as an air pump and an electric pump used for a device other than the on-board optical sensor cleaning device. Further, in the above embodiment, the on-board optical sensor is the on-board camera 5 that captures images at the rear of the vehicle 1. Instead, for example, the on-board optical sensor may be an on-board camera that captures images from the vehicle 1 in other directions. Further, the on-board optical sensor may be a rain sensor or the like used by a CPU or the like to check the amount of rain based on a captured image.

The invention claimed is:

1. An on-board optical sensor cleaning device comprising:
    an electric pump including:
        a tubular cylinder including an intake port, a valve port, and a discharge port, the discharge port being in communication with the valve port, wherein inner and outer sides of the cylinder are in communication through the valve port;
        a piston that is movable back and forth in the cylinder;
        a motor that drives and moves the piston back and forth;
        an intake valve that functions to open and close the intake port;
        a discharge valve that functions to open and close the valve port, wherein when the piston is moved forth to narrow a void in the cylinder, air is compressed in the cylinder, the discharge valve is configured to open when operated by the piston that moves forth, the cylinder includes a liquid inlet, washer liquid is drawn through the liquid inlet and stored in a liquid reservoir between the valve port and the discharge port, and the discharge valve opens and discharges compressed air from the valve port so that fluid, which is a mixture of the washer liquid stored beforehand in the liquid reservoir and the compressed air from the valve port, is discharged from the discharge port; and a nozzle unit including a nozzle connected to the discharge port, the nozzle having an ejection port, wherein the on-board optical sensor cleaning device ejects the fluid from the ejection port toward an external image capturing surface of the on-board optical sensor to remove foreign material from the external image capturing surface.

2. The on-board optical sensor cleaning device according to claim 1, wherein the discharge valve includes an operation projection that projects into the cylinder, and the discharge valve is operated when the operation projection is pushed by the piston.

3. The on-board optical sensor cleaning device according to claim 1, wherein a fluid check valve is arranged in the liquid inlet to permit the washer liquid to flow into the liquid reservoir and prevent reversed flow of the fluid.

4. The on-board optical sensor cleaning device according to claim 1, wherein a holding valve is located in a portion of the liquid reservoir proximate to the discharge port, and the holding valve prevents outflow of the fluid from the discharge port when the discharge valve is closed, and the holding valve opens when the discharge valve opens.

5. The on-board optical sensor cleaning device according to claim 1, wherein the valve port, the liquid reservoir, and the discharge port are arranged along a straight line.

6. The on-board optical sensor cleaning device according to claim 1, wherein the electric pump further includes a biasing member that biases the discharge valve to close, and the biasing member has characteristics set so as not to open the discharge valve with the compressed air.

7. The on-board optical sensor cleaning device according to claim 1, wherein the nozzle is operative to move between a cleaning position and a non-cleaning position by a delivering pressure of the fluid ejected from the electric pump, the ejection port is located proximate to an image capturing range center of the on-board optical sensor when the nozzle is located at the cleaning position, and the ejection port is located farther from the image capturing range center than the cleaning position when the nozzle is located at the non-cleaning position.

8. The on-board optical sensor cleaning device according to claim 7, wherein the nozzle unit includes a coil spring, and when the electric pump is not driven, the nozzle is located at the non-cleaning position due to a biasing force of the coil spring.

* * * * *